US012578791B1

(12) United States Patent
Lutter

(10) Patent No.: US 12,578,791 B1
(45) Date of Patent: Mar. 17, 2026

(54) GAZE-BASED INPUT SYSTEMS

(71) Applicant: Apple Inc., Cupertino, CA (US)

(72) Inventor: Gregory Lutter, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/886,823

(22) Filed: Sep. 16, 2024

Related U.S. Application Data

(60) Provisional application No. 63/586,221, filed on Sep. 28, 2023.

(51) Int. Cl.
| | |
|---|---|
| *G06F 3/01* | (2006.01) |
| *G06T 15/00* | (2011.01) |
| *G06T 19/00* | (2011.01) |

(52) U.S. Cl.
CPC .............. *G06F 3/013* (2013.01); *G06T 15/00* (2013.01); *G06T 19/006* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 10,852,814 B1 * | 12/2020 | Caron | ................... | G06T 19/006 |
| 12,135,862 B2 * | 11/2024 | Goodrich | ................ | G06F 3/011 |
| 2022/0206588 A1 * | 6/2022 | Canberk | ............... | G06F 3/0304 |
| 2022/0334649 A1 * | 10/2022 | Hwang | ............... | G06F 3/04817 |

FOREIGN PATENT DOCUMENTS

| | | | | |
|---|---|---|---|---|
| WO | WO-2024253941 A1 * | 12/2024 | ............. | G06T 19/20 |

* cited by examiner

*Primary Examiner* — Nicholas J Lee
(74) *Attorney, Agent, or Firm* — Kubota & Basol LLP

(57) ABSTRACT

This relates to gaze-based input systems and methods for reducing unintended gaze input(s) in a three-dimensional environment. In some examples, an electronic device presents a three-dimensional environment that includes affordances for triggering events in a foveal region of the user interface, and one or more indicators that provide visual feedback on the execution or progress of the triggered events in a perifoveal region of the user interface. Displaying an indicator in the perifoveal region that provides visual feedback concurrently with the user's gaze upon affordances in the foveal region can provide a confirmation or refutation of the user's intended gaze inputs through a visual detection of changes to the appearance of the indicator (e.g., movement of the indicator, changes to the shape/boundaries/graphics of the indicator, or changes to the color and/or brightness of the indicator).

24 Claims, 16 Drawing Sheets

Device
201

1200

1300

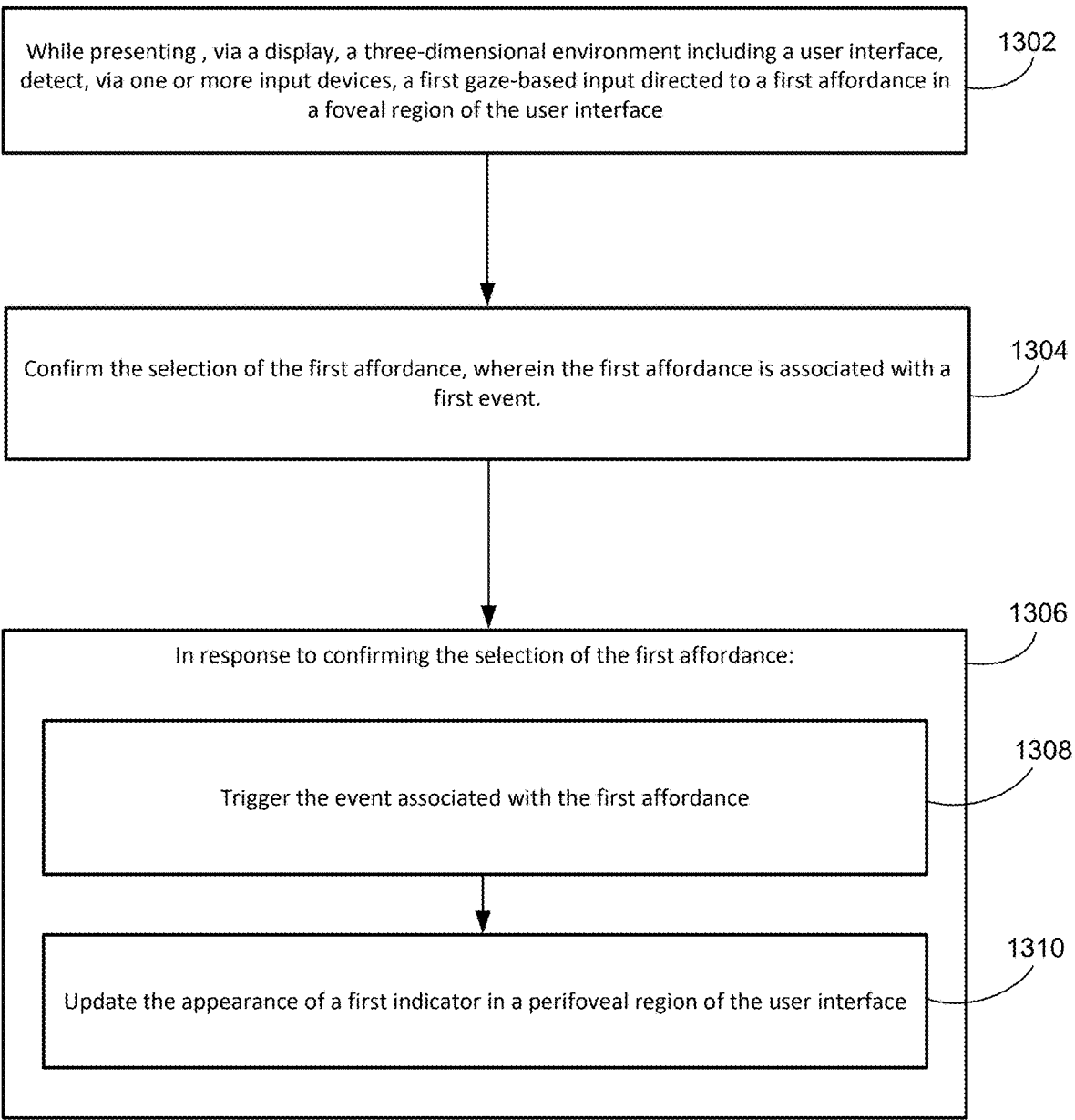

While presenting , via a display, a three-dimensional environment including a user interface, detect, via one or more input devices, a first gaze-based input directed to a first affordance in a foveal region of the user interface                                    1302

Confirm the selection of the first affordance, wherein the first affordance is associated with a first event.                                    1304

In response to confirming the selection of the first affordance:                                    1306

Trigger the event associated with the first affordance                                    1308

Update the appearance of a first indicator in a perifoveal region of the user interface                                    1310

FIG. 13

GAZE-BASED INPUT SYSTEMS

CROSS-REFERENCE TO RELATED APPLICATIONS

This application claims the benefit of U.S. Provisional Application No. 63/586,221, filed Sep. 28, 2023, the content of which is herein incorporated by reference in its entirety for all purposes.

FIELD OF THE DISCLOSURE

This application generally relates to systems and methods for gaze-based input systems.

BACKGROUND OF THE DISCLOSURE

Some computer graphical environments provide two-dimensional and/or three-dimensional environments (e.g., extended reality environments) where at least some objects displayed for a user's viewing are virtual and generated by a computer. In some examples, the objects (e.g., including virtual user interfaces, such as a virtual navigation user interface) that are displayed in the three-dimensional environments are configured to be interactive (e.g., via direct or indirect inputs provided by the user). In some examples, an object (e.g., including a virtual user interface) is displayed with a respective appearance (e.g., a degree of detail of the virtual user interface, a number of user interface objects included in the virtual user interface, a size of the virtual user interface, etc.) in the three-dimensional environment.

Gaze/eye tracking is a convenient, intuitive, but at times a potentially inaccurate method for providing user input due to various factors. Human eyes are not optimized for precise targeting of objects, as they tend to flit and move about quickly within an environment. This inherent nature of eye movement introduces ambiguity in detecting intended eye gaze user inputs, leading to potential errors in interpreting user intentions. The utilization of gaze-based user interfaces can induce trepidation in users because unintended eye movement can result in erroneous inputs and unintended operations.

SUMMARY OF THE DISCLOSURE

Some examples of the disclosure are directed to a gaze-based input system that reduces unintended gaze input(s) in a three-dimensional environment. In some examples, an electronic device presents, via a display in communication with the electronic device, a three-dimensional environment. The three-dimensional environment can include a user interface including one or more virtual objects. The user interface can include a foveal region and a perifoveal region. The foveal region of the user interface can encompass one or more affordances located generally in an intended gaze target area of the user interface that can be received and captured with high visual acuity by the fovea of the user's retina when the user is gazing at the one or more affordances, while the perifoveal region of the user interface can be a region surrounding the foveal region and located relative to the one or more affordances in an area that can be captured with lower visual acuity by the perifovea of the user's retina when the user is gazing at the one or more affordances. One or more virtual objects in the form of user-selectable affordances for triggering events can be located in the foveal region of the user interface, while one or more indicators that provide visual feedback on the execution or progress of the triggered events can be located in the perifoveal region of the user interface. Displaying an indicator in the perifoveal region of the user interface that provides visual feedback concurrently with the user's gaze upon affordances in the foveal region of the user interface can provide a confirmation or refutation of the user's intended gaze inputs through a visual detection of changes to the appearance of the indicator (e.g., movement of the indicator, changes to the shape/boundaries/graphics of the indicator, or changes to the color and/or brightness of the indicator). This concurrent feedback allows the user to recognize either the expected or unintended execution and/or progression of parameter changes to reduce unintended gaze input(s) in a three-dimensional environment.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

FIG. 13 is a flow diagram illustrating an example process for displaying user interfaces associated with gaze-activated affordances in a foveal region of a user interface for triggering an event along with an indicator in a perifoveal region of the user interface for providing visual feedback on the event according to some examples of the disclosure.

DETAILED DESCRIPTION

Figure 1:
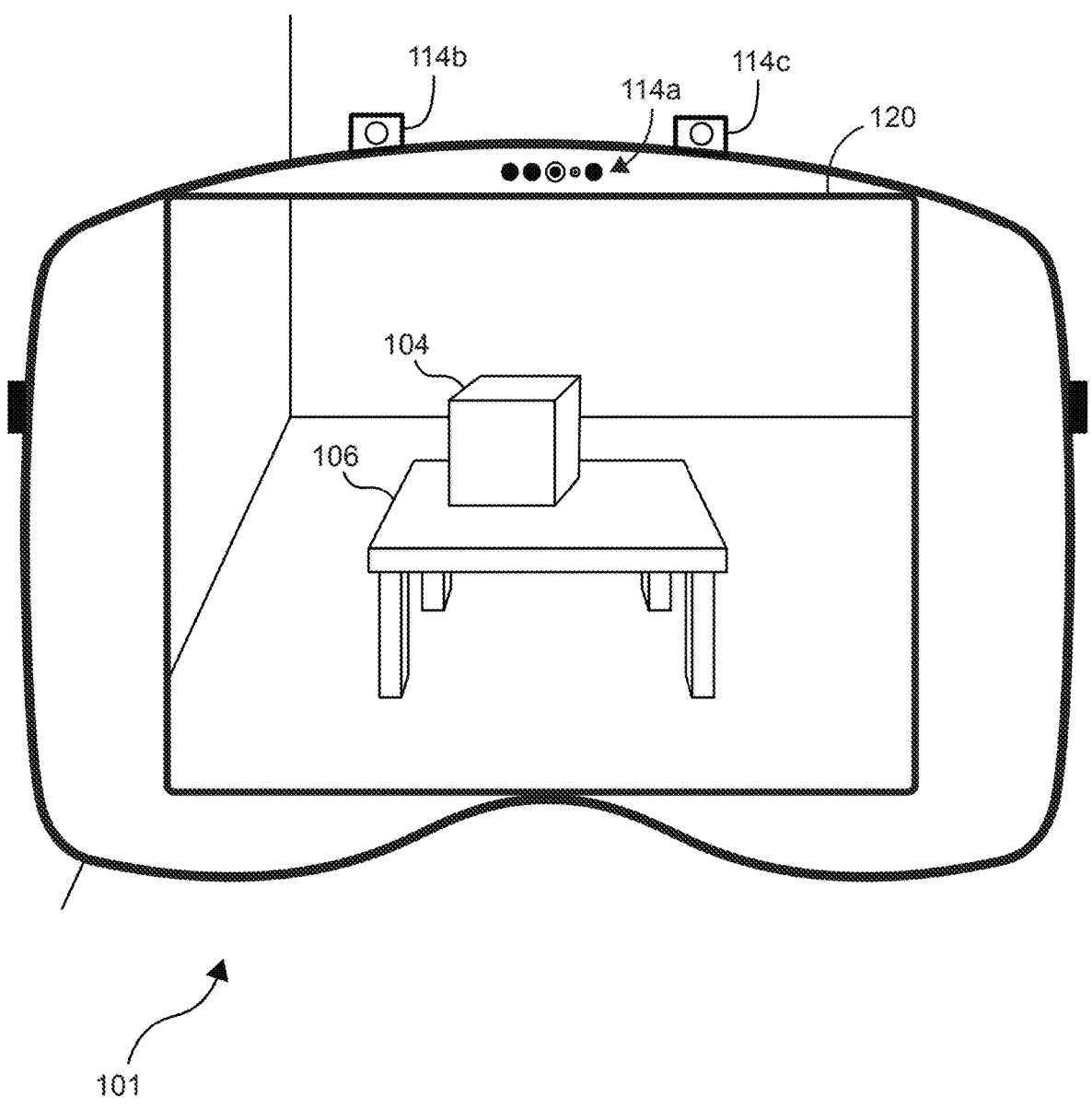
FIG. 1 illustrates an electronic device presenting a three-dimensional environment according to some examples of the disclosure.

In the following description of examples, reference is made to the accompanying drawings which form a part hereof, and in which it is shown by way of illustration specific examples that are optionally practiced. It is to be understood that other examples are optionally used and structural changes are optionally made without departing from the scope of the disclosed examples.

Some examples of the disclosure are directed to methods for a gaze-based input system that reduces unintended gaze input(s) in a three-dimensional environment. In some examples, an electronic device presents, via a display in communication with the electronic device, a three-dimensional environment. The three-dimensional environment can include a user interface including one or more virtual objects. The user interface can include a foveal region and a perifoveal region. The foveal region of the user interface can encompass one or more affordances located generally in an intended gaze target area of the user interface that can be received and captured with high visual acuity by the fovea of the user's retina when the user is gazing at the one or more affordances, while the perifoveal region of the user interface can be a region surrounding the foveal region and located relative to the one or more affordances in an area that can be captured with lower visual acuity by the perifovea of the user's retina when the user is gazing at the one or more affordances. One or more virtual objects in the form of user-selectable affordances for triggering events can be located in the foveal region of the user interface, while one or more indicators that provide visual feedback on the execution or progress of the triggered events can be located in the perifoveal region of the user interface. Displaying an indicator in the perifoveal region of the user interface that provides visual feedback concurrently with the user's gaze upon affordances in the foveal region of the user interface can provide a confirmation or refutation of the user's intended gaze inputs through a visual detection of changes to the appearance of the indicator (e.g., movement of the indicator, changes to the shape/boundaries/graphics of the indicator, or changes to the color and/or brightness of the indicator). This concurrent feedback allows the user to recognize either the expected or unintended execution and/or progression of parameter changes to reduce unintended gaze input(s) in a three-dimensional environment.

The fovea is a region of the retina that is approximately 0.3 mm in diameter, and is capable of detecting objects, and motion of those objects, with high visual acuity (e.g., high detail and definition). Thus, when a user gazes at a particular location in a three-dimensional environment, a central field of vision at the location of the user's gaze is received by the fovea of the user's retina, and the user can see objects within their central field of vision with sharp detail. In contrast, the perifovea is an area outside of the fovea that extends beyond the fovea to a diameter of approximately 1.5 mm, and is capable of motion detection and peripheral, low-acuity vision (e.g., reduced detail and definition). Thus, when a user gazes at a particular location in a three-dimensional environment, peripheral areas outside the user's central field of vision are received by the perifovea, where objects and/or text in those areas can appear blurry and/or unreadable. Yet, some amount of situational awareness is still possible when an object and/or text appears in the perifovea due to the inherent sensitivity to motion provided by the perifovea.

For example, while a user may be able to gaze at an object in the user's central field of vision and detect precise movements of, or changes to, that object, the user may be able to concurrently sense that an object in the user's peripheral vision is generally moving or changing in a particular direction or manner, without further detail. There-fore, some examples of the disclosure are directed to pre-senting one or more objects in a perifoveal region of a user interface that can move or change while the user provides gaze input directed to one or more objects in a foveal region of the user interface to concurrently provide confirmation or refutation of the user's intended gaze inputs in the foveal region of the user interface.

In some examples, the virtual object(s) can be associated with an event and include one or more affordances displayed in the foveal region of the user interface and one or more indicators in the perifoveal region of the user interface. The affordances are selectable to trigger an event. An event, as defined herein, is the transition of a computer system from a first state to a second state. For example, an event can include volume decrease/increase, playing speed decrease/increase, or progression or regression of a temporal position or time stamp. While presenting the three-dimensional envi-ronment that includes the one or more virtual objects, the electronic device detects, via one or more input devices in communication with the electronic device, a gaze-based input. In response to detecting the input, an event is triggered and a parameter associated with the event (e.g., the volume level of the device) is adjusted. In addition, the electronic device transitions from displaying an indicator in a visual state to displaying the indicator in a different visual state. For example, the electronic device can cause the indicator in the perifoveal region to exhibit movement or otherwise change its appearance.

The changes to the appearance of the indicator are an indication of the triggering of events and/or progression of parameter changes due to those events. Displaying an indi-cator in the perifoveal region of the user interface that changes its appearance concurrently with the user's gaze in the foveal region of the user interface can provide a confir-mation or refutation of the user's intended gaze inputs through a visual detection of changes to the appearance of the indicator. As defined herein, changes to the appearance of the indicator are inclusive of movement of the indicator, changes to the shape/boundaries/graphics of the indicator, or changes to color and/or brightness of the indicator. This concurrent feedback allows the user to recognize either the expected or unintended execution and/or progression of parameter changes to reduce or eliminate undesired or unintended gaze input(s) in a three-dimensional environ-ment.

In some examples, wide and/or judicious spacing of virtual objects reduces or eliminates undesired or unintended gaze input(s). By spacing out the objects, the chances of a user's gaze upon one virtual object inadvertently landing on another closely spaced virtual object and accidentally get-ting selected are reduced.

In some examples, a multi-step sequence may be required to confirm an event, such as initially gazing at a virtual object (e.g., selecting the virtual object), then gazing at a secondary virtual object (e.g., selecting the secondary virtual object) to confirm the event. A multi-step selection sequence can advantageously decrease the likelihood of accidental input(s) by requiring a series of deliberate and intentional steps before an action is initiated.

In some examples, a three-dimensional object is displayed in a computer-generated three-dimensional environment with a particular orientation that controls one or more behaviors of the three-dimensional object (e.g., when the three-dimensional object is moved within the three-dimen-sional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environ-ment, the user may select a particular orientation for the three-dimensional object or the electronic device may auto-matically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be config-ured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset relative to the user.

As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

FIG. 1 illustrates an electronic device 101 presenting a three-dimensional environment (e.g., an extended reality (XR) environment such as a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114a oriented towards a face of the user (e.g., eye tracking cameras described below with reference to FIG. 2). In some examples, internal image sensors 114a are used for eye tracking (e.g., detecting a gaze of the user). Internal image sensors 114a are optionally arranged on the left and right portions of display 120 to enable eye tracking of the user's left and right eyes. In some examples, electronic device 101 also includes external image sensors 114b and 114c facing outwards from the user to detect and/or capture the physical environment of the electronic device 101 and/or movements of the user's hands or other body parts.

In some examples, display 120 has a field of view visible to the user (e.g., that may or may not correspond to a field of view of external image sensors 114b and 114c). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114b and 114c.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
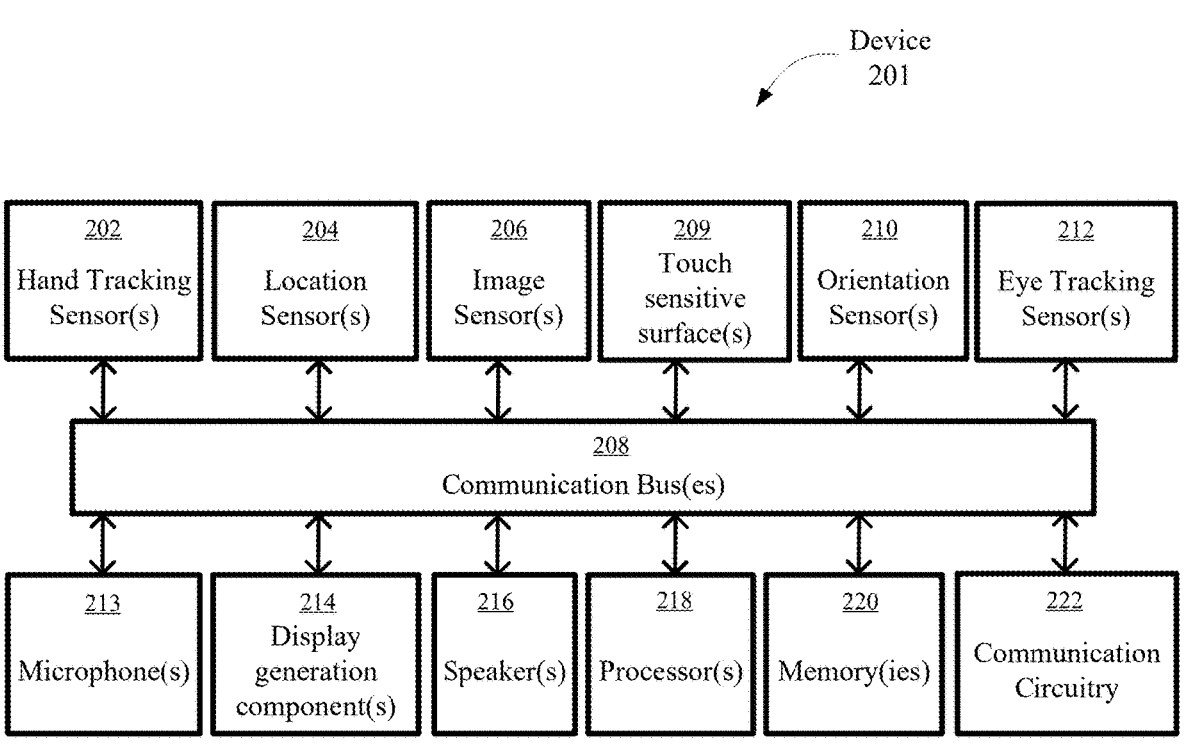
FIG. 2 illustrates a block diagram of an example architecture for a device according to some examples of the disclosure.

FIG. 2 illustrates a block diagram of an example architecture for an electronic device 201 according to some examples of the disclosure. In some examples, electronic device 201 includes one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114a and/or external image sensors 114b and 114c in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a GPS receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s)

210 to track changes in the position and/or orientation of electronic device 201 and/or display generation component (s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/ or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, torso, or head of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201, is optionally referred to herein as a user or users of the device.

Figure 3A:
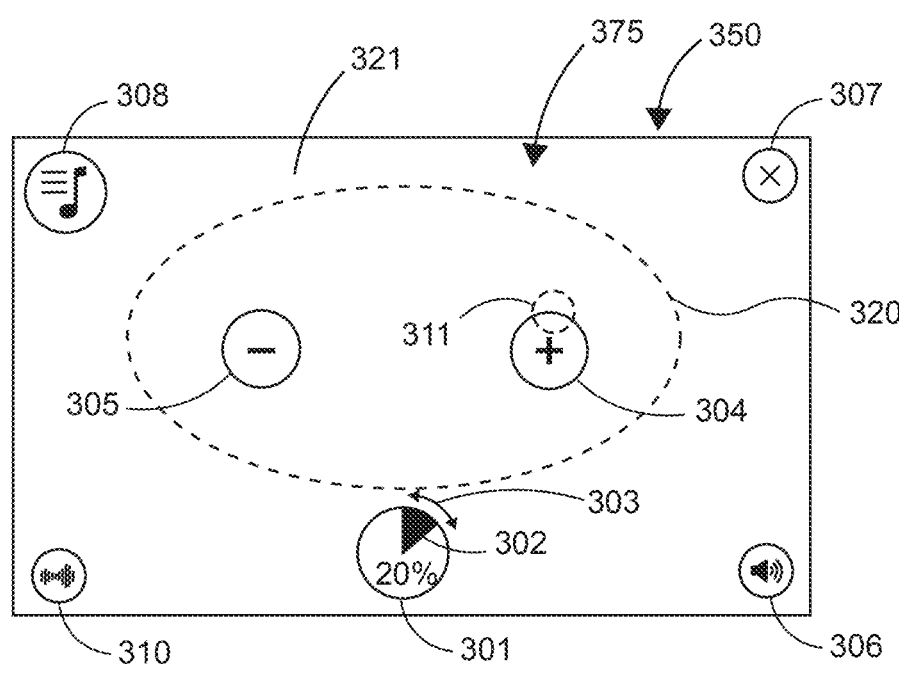
FIG. 3A illustrates a plurality of gaze-activated affordances in a foveal region of a user interface for volume adjustment along with a pie chart indicator in a perifoveal region of the user interface for providing visual feedback on the volume adjustment according to some examples of the disclosure.

FIG. 3A illustrates a plurality of gaze-activated affordances in a foveal region 320 of a user interface for volume adjustment along with a pie chart indicator in a perifoveal region 321 of the user interface for providing visual feedback on the volume adjustment according to some examples of the disclosure. As shown in FIG. 3A, an electronic device (e.g., the electronic device 201 of FIG. 2) displays a three-dimensional environment 350 that includes a plurality of user interface objects. Although FIG. 3A illustrates the concurrent display of virtual objects (e.g., indicator 301, affordances 304, 305, virtual objects 308 and 310), in some examples only a subset of these virtual objects may be presented at any moment in time, and in other examples some of the virtual objects may continue to be displayed, although in a "greyed-out" (e.g., unselectable) state. For example, the electronic device can concurrently display or present one or more affordances (e.g., one or more selectable buttons) and an indicator (e.g., a pie chart indicator). In some examples, the user interface for volume adjustment, including the plurality of user interface objects in the user interface, is displayed in a head-locked orientation in the three-dimensional environment 350 with a distance and orientation offset relative to a portion of the user's head. In the example of FIG. 3A, the user interface for volume adjustment including one or more affordances and indicator can be associated with one or more volume adjustment events, and can be displayed in a head-locked orientation relative to the three-dimensional environment 350 such that the user interface always appears in the same orientation and distance in the three-dimensional environment from the perspective of the user. In the example of FIG. 3A, affordance 304 can be associated with a volume increase, and can be selectable to trigger a volume increase event. Affordance 305 can be associated with a volume decrease, and can be selectable to trigger a volume decrease event. Pie chart indicator 301 can change its appearance to provide a dynamic confirmation or refutation of an expected event while the user's gaze remains directed at the foveal region of the user interface, and additionally a static confirmation or refutation of the expected event when the user's gaze is redirected to the indicator itself.

As noted above, the one or more affordances can be displayed in the foveal region of the user interface while the indicator is displayed in the perifoveal region of the user interface. The foveal region 320 of the user interface (hereinafter referred to simply as the "foveal region") can encompass one or more affordances (e.g., affordances 304 and 305) located generally in an intended gaze target area of the user interface that can be received and captured with high visual acuity by the fovea of the user's retina when the user is gazing at the one or more affordances and is intended to be the target (at times) of the user's gaze and observable within the user's central field of vision. However, it should be understood that the foveal region may not be captured with high visual acuity by the fovea of the user's retina when the user is not gazing at the one or more affordances. The perifoveal region 321 of the user interface (hereinafter referred to simply as the "perifoveal region") can be a region surrounding the foveal region and located relative to the one or more affordances in an area that can be captured with lower visual acuity by the perifovea of the user's retina when the user is gazing at the one or more affordances. In other words, in some examples, a perifoveal region relative to a particular portion of an interface (e.g., one or more affordances), may include regions of the interface that can be captured by the perifovea of the user's retina when the user is gazing at the particular portion of the interface.

In one example, the foveal region 320 can be a region located within a cone angle of 1.5 degrees from a surface normal representing the user's gaze upon one of the affordances in the target area of the user interface (referred to herein as a 3 degree diameter), while the perifoveal region 321 can be a region outside the 3 degree diameter but within a cone angle of 7.5 degrees from the surface normal (referred to herein as a 15 degree diameter).

The preceding example assumes that the affordances in the target area are "point affordances" having no effective area such that there is only one point on an affordance at which the user's gaze can be fixed. However, in other more common examples, the affordances define a nonzero area, such as affordances 304 and 305 in FIG. 3A. Because affordances in these other examples have a nonzero area, and because the user's gaze can be fixed upon any one of a number of points within the affordance (including perimeter areas within the affordance, such as illustrated by gaze 311 upon a perimeter area of affordance 304 in FIG. 3A), the foveal region of such an affordance can be defined as the union of all 1.5 degree cone angles (e.g., 3 degree diameter circles) formed at all points within the affordance. The effect of this union is that for each affordance with a nonzero area, the general shape of the foveal region for that affordance can be a larger version of the shape of the affordance, resulting from the largest combination (e.g., a union) of all the 3 degree diameter circles. In some examples, if multiple clustered affordances are present and are sufficiently close together such that their foveal regions overlap, the shape of the effective foveal region encompassing the multiple affordances can generally follow the shape of the cluster. For example, the two affordances 304 and 305 in FIG. 3A can represent a horizontally elongated two-affordance cluster, and therefore the shape of the effective foveal region 320 encompassing affordances 304 and 305 can take the form of two horizontally arranged but partially merged circles (e.g., a horizontally elongated ellipse).

In addition, in some examples the perifoveal region of an affordance with a nonzero area can be defined by first determining the intersection of all 7.5 degree cone angles (e.g., 15 degree diameter circles) formed at all points within the affordance. The general shape of this intersection area can follow the shape of the affordance, resulting from the smallest combination (e.g., an intersection) of all the 15 degree diameter circles. The perifoveal region of the affordance can then be determined by subtracting the determined foveal region from the determined intersection area. Defining the perifoveal region of an affordance as being the smallest combination (e.g., intersection) of the 15 degree diameter circles minus the largest combination (e.g., union) of the 3 degree diameter circles prevents the perifoveal region from being unrealistically far away from the user's gaze under a worst case situation. In some examples, if multiple clustered affordances are present and are sufficiently close together such that their perifoveal regions overlap, the shape of the effective perifoveal region encompassing the multiple affordances can be a ring-shaped region (e.g., an annulus) outside or beyond the foveal region that generally follows the shape of the cluster. For example, the two affordances 304 and 305 in FIG. 3A can represent a horizontally elongated two-affordance cluster, and therefore the shape of the effective perifoveal region encompassing affordances 304 and 305 can take the form of a horizontally elongated annulus that surrounds the foveal region 320.

In the example of FIG. 3A, two affordances 304 and 305 are located the central area of the user interface. Accordingly, the foveal region 320 can encompass affordance 304 and affordance 305 and be elliptical in shape as shown in FIG. 3A, while the perifoveal region 321 can be the region surrounding the foveal region. In other examples, depending on the number of affordances that may be clustered within foveal region 320, the foveal region can encompass those affordances and take on any number of shapes. While foveal region 320 is shown as being located within the central area of user interface 375, it should be appreciated that the foveal region of an interface can encompass other portions of an interface depending on the placement of affordances therewithin. For example, an interface having single affordance in the top right corner will have a foveal region encompassing that affordance and similarly positioned in the top right corner.

As noted above, gaze-activated affordances can be located within the foveal region. In some examples, gaze-activated affordances can have a circular shape and are spaced apart by factor of three times the diameter of an individual affordance. In other examples, the affordances can have other shapes and other spacings. For example, gaze-activated affordances can be spaced apart at a distance that has been empirically determined to reduce the chance of gaze input errors from expected fluctuations in eye gaze due to conditions such as gaze evoked nystagmus or ocular flutter.

As noted above, an indicator can be located within the perifoveal region. The indicator can take on many forms, some of which will be discussed in greater detail below. In some examples, the indicator can be displayed at any location along the perifoveal region of a three-dimensional (3D) computer-generated environment. In various examples, an indicator can consume different amounts of the available perifoveal region, up to and including the entirety of the perifoveal region. Note that the particular example of FIG. 3A, with a minimized indicator 301 at the bottom-center of the user interface, offers an improved field of view (FOV) economy and can provide an improved user experience as compared to other examples in which the indicator consumes more of the perifoveal region.

As illustrated by FIG. 3A, the electronic device can also display one or more virtual objects (e.g., virtual objects 306, 307, 308 and 310) in a volume adjustment user interface, each of which can be associated with a volume adjustment event. For example, virtual object 306 can be selected to access the volume adjustment user interface 375 that includes affordances 304 and 305 and pie chart indicator 301 associated with a volume increase/decrease. In another example, the virtual object 308 can trigger the display of a list of content items to select for playing, or a list of content items to browse. The content items can include any media that are selectable for being presented concurrently with the display of one or more virtual objects. In other examples, virtual object 308 can trigger the display of an audio menu that includes a selection (e.g., virtual object 306) for a volume adjustment user interface 375, and a selection for playing the content items, among other selections. In some examples, virtual object 310 can be associated with launching a voice assistant capable of recognizing and responding to a user's voice commands. In some examples, the electronic device can display one or more virtual objects 307 for exiting the volume adjustment user interface 375. For example, as shown in FIG. 3A, the display of volume adjustment user interface 375 can be terminated (optionally to trigger the display of a different user interface (e.g., different from a volume adjustment user interface)) once the user selection of virtual object 307 is confirmed.

In some examples, an indicator can be displayed in the perifoveal region according to an orientation and/or geometric configuration relative to the location of one or more affordances. For example, an indicator can be displayed in a region that extends outwards from the perimeter of the foveal region or from the center of virtual objects (e.g., akin to a center of mass) displayed in the foveal region, such as affordances 304 and 305 in FIG. 3A, within a range of a 6 degree diameter to a 7.5 degree diameter. The locations of the affordances 304 and 305, as shown in FIG. 3A, can form a triangular geometry along with the location of indicator 301. Alternatively, although not shown in FIG. 3A, the locations of the affordances 304 and 305 can form a linear geometry along with the location of indicator 301 that is horizontal relative to a user's viewpoint. In general, the indicator 301 can be displayed in the perifoveal region in any configuration and/or orientation with respect to affordances 304 and 305.

In some examples, the user can selectively change or customize the locations of the indicator 301 and/or affordances 304 and 305, and/or adjust the sizes of the indicators and/or affordances in accordance with the user's needs, preferences and/or intentions. In other words, the geometric configuration, size and/or orientation of the affordances, indicator, and other objects in the user interface can be curated to enhance user experience while possibly reducing gaze input errors. For example, the user may have an affliction involving their eyesight (e.g., gaze instability) that would necessitate use of specific sizes or placements of virtual objects. In another example, the user may expect to perform more volume increases than decreases, and as such, may prefer that indicator 301 be placed closer to affordance 304 than affordance 305. In one nonlimiting example, a user interface such as the volume adjustment user interface 375 of FIG. 3A can be presented, but prior to activation of the virtual objects in the volume adjustment user interface (e.g., prior to the selection of virtual object 306), individual virtual objects can be selected, dragged or otherwise relocated and optionally resized via user input.

Indicator 301 can take on different forms. In some examples, such as in FIG. 3A, an indicator displayed in the perifoveal region can feature a pie-shaped geometric characteristic and/or appearance, including a circular shell with a centrally located pivot point. Additionally, in some examples, the indicator can include a virtual object in the shape of a slice that exhibits the progression of parameter changes due to the occurrence of one or more events. In the example of FIG. 3A, pie chart indicator 301 can have a circular perimeter and a slice 302 that optionally can have a different color from the color of the background user interface 375.

Pie chart indicator 301 can exhibit changes to its appearance as a result of gaze inputs provided in the foveal region and can provide a dynamic visual confirmation (or refutation) of an expected event while the user's gaze is directed to the foveal region. In the example of FIG. 3A, pie chart indicator 301 can be associated with a volume decrease/increase event, and an increase or decrease in the area of slice 302 as indicated by arrows 303 can be noticed by a user as a dynamic confirmation or refutation of an expected volume change in a particular direction (e.g., a volume increase or decrease), even though the user's gaze is directed to the foveal region. In addition to the change in area of the slice 302, other changes to the appearance of the indicator can include motion of the indicator including any movements in any direction in a three-dimensional (3D) computer-generated environment, or changes to the size of some or all of the indicator (which can also be sensed as motion). Various combinations of these changes in the appearance of the indicator (e.g., movement, area, size, shape, color, brightness and the like) can be employed together. These different types of changes to the appearance of indicator 301, from one visual state to another visual state, are indicative of a change in state of a parameter associated with the event (e.g., from one volume level or state to another volume level or state). Additionally, pie chart indicator 301 can provide a static confirmation or refutation of the expected event when the user's gaze is redirected to the indicator itself.

In one example, after the user's gaze 311 is determined to be directed at affordance 304 (e.g., the volume increase button) for a duration exceeding a threshold, the user's intended gaze-input selecting the affordance 304 can be confirmed. Following the confirmation, the slice 302 can expand clockwise to indicate increasing volume. Visually, the pie chart indicator 301 can appear to be filling in with an expanding slice 302 that optionally has a different appearance (e.g., color) from the background user interface 375. A similar change in the opposite direction (e.g., counterclockwise shrinking of slice 302) can occur when a selection of affordance 305 is confirmed for a gaze directed at affordance 305 (e.g., the volume decrease button). As noted above, even though pie chart indicator 301 is displayed outside the user's gaze in the perifoveal region, changes to the appearance of the indicator can be visually recognized or sensed by the user. In the example of FIG. 3A, the user is able to recognize or sense the motion associated with a volume increase or decrease of the slice 302 of pie chart indicator 301 and obtain feedback in the form of a confirmation or a refutation of the action intended by the user's gaze in the foveal region.

Figure 3B:
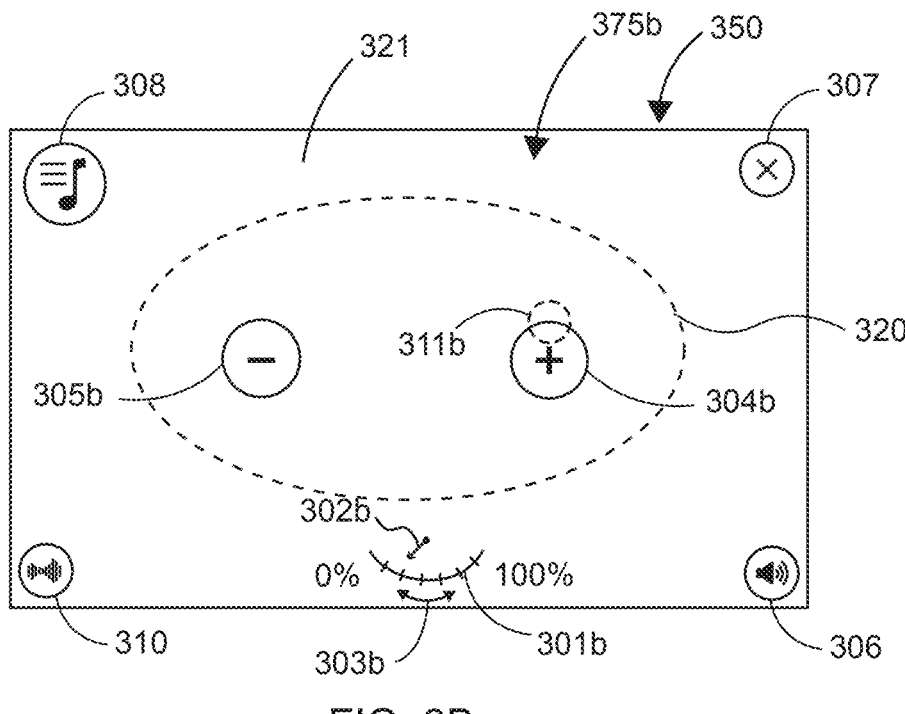
FIG. 3B illustrates a plurality of gaze-activated affordances in a foveal region of a user interface for volume adjustment along with a dial indicator in a perifoveal region of the user interface for providing visual feedback on the volume adjustment according to some examples of the disclosure.

FIG. 3B illustrates a plurality of gaze-activated affordances in a foveal region of a user interface for volume adjustment along with a dial indicator in a perifoveal region of the user interface for providing visual feedback on the volume adjustment according to some examples of the disclosure. As shown in FIG. 3B, an electronic device (e.g., the electronic device 201 of FIG. 2) displays a three-dimensional environment 350 that includes a plurality of user interface objects. For example, the electronic device can display or present one or more affordances (e.g., one or more selectable buttons) and an indicator (e.g., a dial indicator). The one or more affordances and indicator can be associated with one or more volume adjustment events. For example, affordance 304b can be associated with a volume increase, and can be selectable to trigger a volume increase event. Affordance 305b can be associated with a volume decrease, and can be selectable to trigger a volume decrease event. Indicator 301b can change its appearance to provide a dynamic confirmation or refutation of an expected volume adjustment event while the user's gaze remains directed at the foveal region, and additionally to provide a static confirmation or refutation of the expected event when the user's gaze is redirected to the indicator itself.

In the example of FIG. 3B, the indicator displayed in the perifoveal region can feature a dial-shaped appearance, including a movable pointer 302b that exhibits the progression of volume changes in either direction as indicated by arrow 303b due to the occurrence of one or more volume increase or decrease events. As illustrated by FIG. 3B, the dial indicator 301b can be represented as a semi-circular incrementally marked number line with a centrally located pivot point. The dial indicator 301b is associated with volume levels of the electronic device, and the present volume level is indicated by a pointer 302*b* that can optionally have a different color from the color of the background user interface 375*b*. For example, as shown in FIG. 3B, the pointer 302*b* is pointing at a marking corresponding to a 20% volume level. In some examples, the left and right ends of the dial indicator 301*b* in the direction of arrows 303*b* correspond to 0% and 100% volume levels, respectively.

Dial indicator 301*b* can exhibit changes to its appearance as a result of gaze inputs provided in the foveal region and can provide a dynamic visual confirmation (or refutation) of an expected volume adjustment event while the user's gaze is directed to the foveal region. For example, movement of pointer 302*b* can be noticed by a user as a dynamic confirmation or refutation of an expected volume change in a particular direction (e.g., a volume increase or decrease), even though the user's gaze is directed to the foveal region. In addition to the movement of the pointer 302*b*, other changes to the appearance of the indicator can include motion of the indicator including any movements in any direction in a three-dimensional (3D) computer-generated environment, or changes to the size of some or all of the indicator (which can also be sensed as motion).

In one example, after the user's gaze 311*b* is determined to be directed at affordance 304*b* (e.g., the volume increase button) for a duration exceeding a threshold, the user's intended gaze-input selecting the affordance 304*b* can be confirmed. Following the confirmation, the pointer 302*b* can rotate counterclockwise to indicate increasing volume. Visually, the dial indicator 301*b* can appear to behave similar to a compass, fuel gauge or the like. In the example of FIG. 3B, the pointer 302*b* may rotate in a counterclockwise direction for as long as the user's gaze 311*b* is determined to be directed at affordance 304*b*, or until a maximum volume level (e.g., 100%) is reached, at which time the movement of the pointer will stop. A similar change in the opposite direction (e.g., clockwise movement of pointer 302*b*) can occur when a selection of affordance 305*b* is confirmed for a gaze directed at affordance 305*b* (e.g., the volume decrease button). As noted above, even though dial indicator 301*b* is displayed outside the user's gaze in the perifoveal region, the change in the appearance of the indicator can be visually recognized or sensed by the user. In the example of FIG. 3B, the user is able to recognize or sense the motion associated with movement of pointer 302*b* of dial indicator 301*b*, and obtain feedback in the form of a confirmation or a refutation of the action intended by the user's gaze in the foveal region.

Figure 3C:
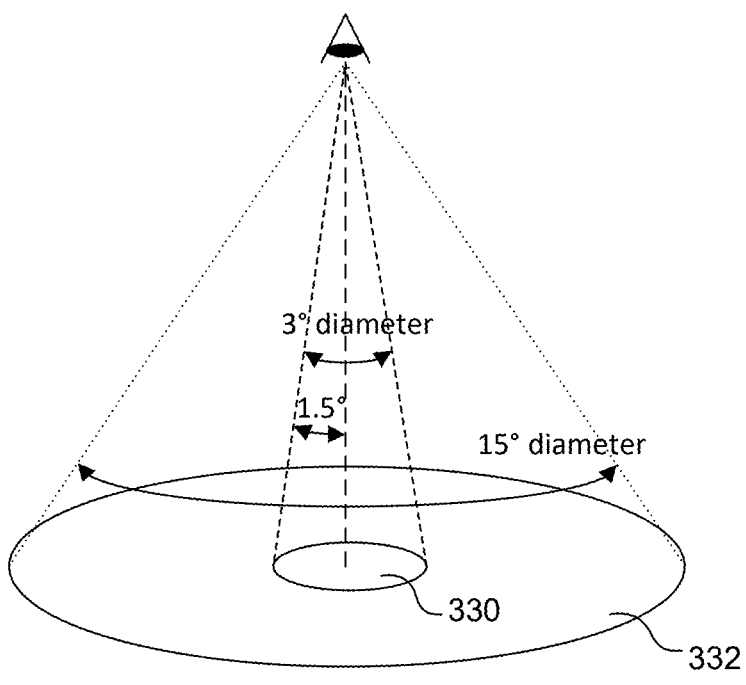
FIG. 3C illustrates a depth perspective view of areas in the user's field of vision that are received by the fovea of the user's retina or received by the perifovea of the user's retina according to some examples of the disclosure.

FIG. 3C illustrates a depth perspective view of areas in the user's field of vision that are received by the fovea of the user's retina or received by the perifovea of the user's retina according to some examples of the disclosure. As shown in FIG. 3C, when the user's gaze is fixed on a point in a plane in space, a circular region 330 within a cone angle of 1.5 degrees from the surface normal representing the user's gaze (e.g., within a 3 degree diameter as that term is defined herein) may be received by the fovea of the user's retina, while a two-dimensional torus-shaped region 332 between the cone angle of 1.5 degrees and a cone angle of 7.5 degrees (e.g., between a 3 degree diameter and a 15 degree diameter as those terms are defined herein) may be received by the perifovea of the user's retina. Being defined by cone angles, these regions are independent of the distance from the user to the plane. In the previously described examples of FIGS. 3A and 3B, and the further examples that follow, affordances located in the foveal region of a user interface appear in region 330 of the user's field of vision, while indicators or other virtual objects located in the perifoveal region of the user interface appear in region 332 of the user's field of vision. In some examples, as noted above, a combination of the foveal regions of both eyes may result in the foveal region encompassing an elliptical shape (e.g., a combination of two circular regions) as depicted by FIGS. 3A-3B and other figures herein.

Figure 4:
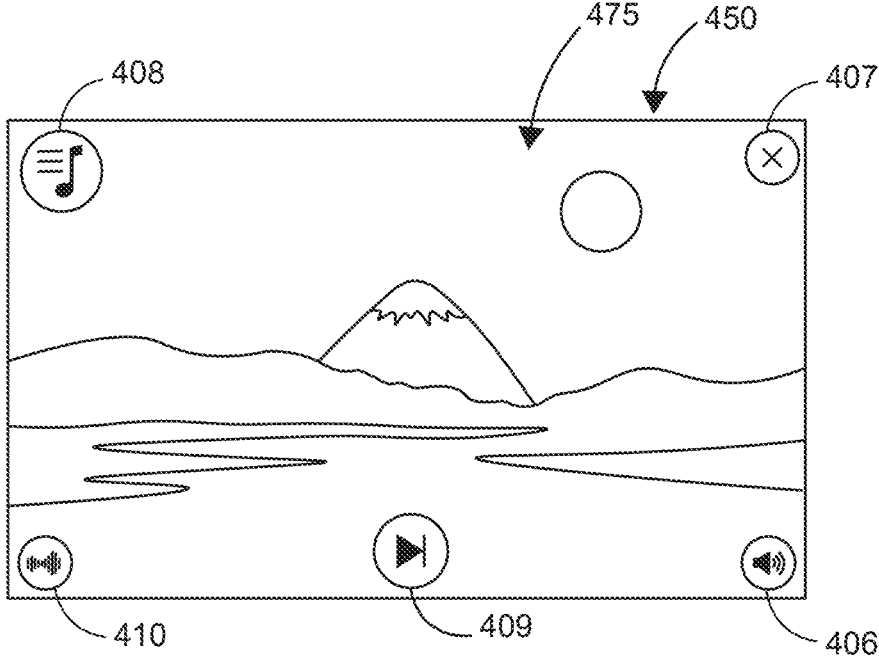
FIG. 4 illustrates a plurality of gaze-activated media-related affordances in an outer region of a user interface, which are selectable for triggering user interfaces associated with each media-related gaze-activated affordance, along with an affordance for playing or pausing content according to some examples of the disclosure.

FIG. 4 illustrates a plurality of gaze-activated audio-related affordances in an outer region of a media user interface which are selectable for triggering user interfaces associated with each media-related gaze-activated affordance, along with an affordance for playing or pausing content according to some examples of the disclosure. For example, a user interface for volume adjustment (e.g., the user interface 375 in the examples of FIGS. 3A and 3B) can be accessed via one of the media-related affordances displayed in a higher-level media (e.g., including audio and/or video) user interface 475. As shown FIG. 4, an electronic device (e.g., the electronic device 201 of FIG. 2) optionally displays virtual objects 406, 407, 408 409, and 410. Virtual object 406 can be associated with accessing a user interface associated with a volume increase/decrease (e.g., the user interface 375 in the examples of FIGS. 3A and 3B). Virtual object 407 can be associated with exiting the media user interface 475. Virtual object 408 can be associated with opening the media user interface 475, and in some examples, can continue to be displayed while the media user interface is being presented. Virtual object 409 can be associated with pausing/resuming the content that is being played in the three-dimensional environment 450. Virtual object 410 can be associated with launching a voice assistant capable of recognizing and responding to a user's voice commands.

In some examples, a virtual object can serve a dual-purpose function, acting both as an affordance and an indicator. Although not explicitly shown in the example of FIG. 4, the user can interact with the higher-level media user interface 475 and select the virtual object 406, which can initiate a transition from displaying the higher-level media user interface 475 to displaying a volume adjustment user interface. After the transition, virtual object 406 can appear in the newly displayed volume adjustment user interface and act as an indicator instead of an affordance for accessing the volume adjustment user interface. In various examples, when acting as an indicator, virtual object 406 can change its appearance, move, create the appearance of motion, and the like. Optionally, during the transition, the virtual object 406 can move to the center of the three-dimensional environment 450 (e.g., extended-reality environment) and replace the placement of virtual object 409. In addition, the virtual object 406 can optionally enlarge in size during the transition for better visibility in the perifoveal region.

Figure 5A:
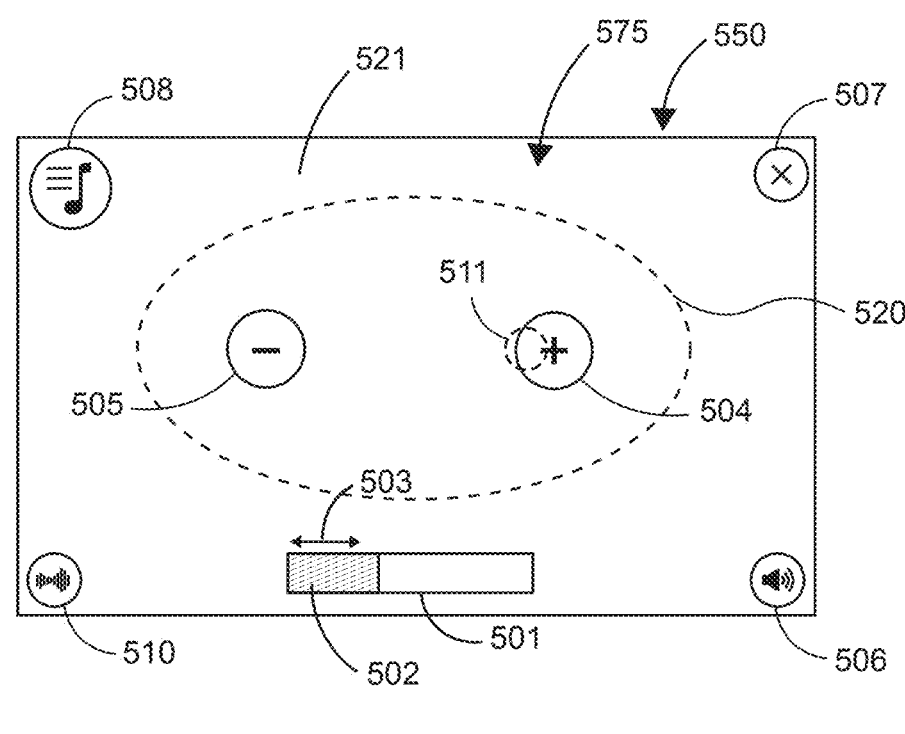
FIG. 5A-5D illustrate a plurality of gaze-activated affordances in a foveal region of a user interface for volume adjustment along with a bar indicator in a perifoveal region of the user interface for providing visual feedback on the volume adjustment according to some examples of the disclosure.

FIGS. 5A-5D illustrate a plurality of gaze-activated affordances in a foveal region of a user interface for volume adjustment along with a bar indicator in a perifoveal region of the user interface for providing visual feedback on the volume adjustment according to some examples of the disclosure. As shown in FIG. 5A, an electronic device (e.g., the electronic device 201 of FIG. 2) displays a three-dimensional environment 550 that includes a plurality of user interface objects. For example, the electronic device can concurrently display or present one or more affordances (e.g., one or more selectable buttons) and an indicator (e.g., a bar indicator). The one or more affordances and indicator can be associated with one or more volume adjustment events. For example, affordance 504 can be associated with a volume increase, and can be selectable to trigger a volume increase event. Affordance 505 can be associated with a volume decrease, and can be selectable to trigger a volume decrease event. In some examples, the affordances can be linearly arranged in an orientation parallel to the bar indicator. In other examples, the affordances can be linearly arranged in an orientation perpendicular to the bar indicator. Bar indicators 501, 501b, 501c, and 501d can change their appearance to provide a dynamic confirmation or refutation of an expected volume adjustment event while the user's gaze remains directed at the foveal region 520, and additionally to provide a static confirmation or refutation of the expected event when the user's gaze is redirected to the indicator itself.

A bar indicator can take on different forms. In some examples, such as in FIG. 5A, an indicator displayed in the perifoveal region 521 can feature a rectangular geometric characteristic and/or appearance, including one or more rectangular slices that exhibit the progression of volume changes in either direction as indicated by arrow 503 due to the occurrence of one or more volume increase or decrease events. In the example of FIG. 5A, the bar indicator 501 can have a rectangular perimeter and the slice 502 can optionally have a different color from the color of the background user interface 575. In some examples, the left and right ends of the bar indicator 501 in the direction of 503 corresponds to 0% and 100% volume levels, respectively.

Bar indicators 501 and 501b can exhibit changes to their appearance as a result of gaze inputs provided in the foveal region and can provide a dynamic visual confirmation (or refutation) of an expected volume adjustment event while the user's gaze is directed to the foveal region. For example, an increase or decrease in the area of slices 502 or 502b can be noticed by a user as a dynamic confirmation or refutation of an expected volume change in a particular direction (e.g., a volume increase or decrease), even though the user's gaze is directed to the foveal region. In addition to the change in area of slices 502 or 502b, other changes to the appearance of the indicator can include motion of the indicator including any movements in any direction in a three-dimensional (3D) computer-generated environment, or changes to the size of some or all of the indicator (which can also be sensed as motion).

In one example, after the user's gaze 511 is determined to be directed at affordance 504 (e.g., the volume increase button) for a duration exceeding a threshold, the user's intended gaze-input selecting the affordance 504 can be confirmed. Following the confirmation, the slice 502 expands linearly to indicate increasing volume. Visually, the bar indicator 501 can appear to be filling in with an expanding slice 502 and optionally having a different appearance (e.g., color) from the background user interface 575. In the example of FIG. 5A, the slice 502 may expand in a horizontal direction for as long as the user's gaze 511 is determined to be directed at affordance 504, or until a maximum volume level (e.g., 100%) is reached, at which time the movement of the slice will stop. A similar change in the opposite direction (e.g., shrinking of slice 502) can occur when a selection of affordance 505 is confirmed for a gaze directed at affordance 505 (e.g., the volume decrease button). As noted above, even though bar indicator 501 is displayed outside the user's gaze in the perifoveal region, the change in the appearance (e.g., motion) of the indicator can be visually recognized or sensed by the user. In the example of FIG. 5A, the user is able to recognize or sense the motion associated with a volume increase or decrease of the slice 502 of bar indicator 501 and obtain feedback in the form of a confirmation or a refutation of the action intended by the user's gaze in the foveal region.

Figure 5B:
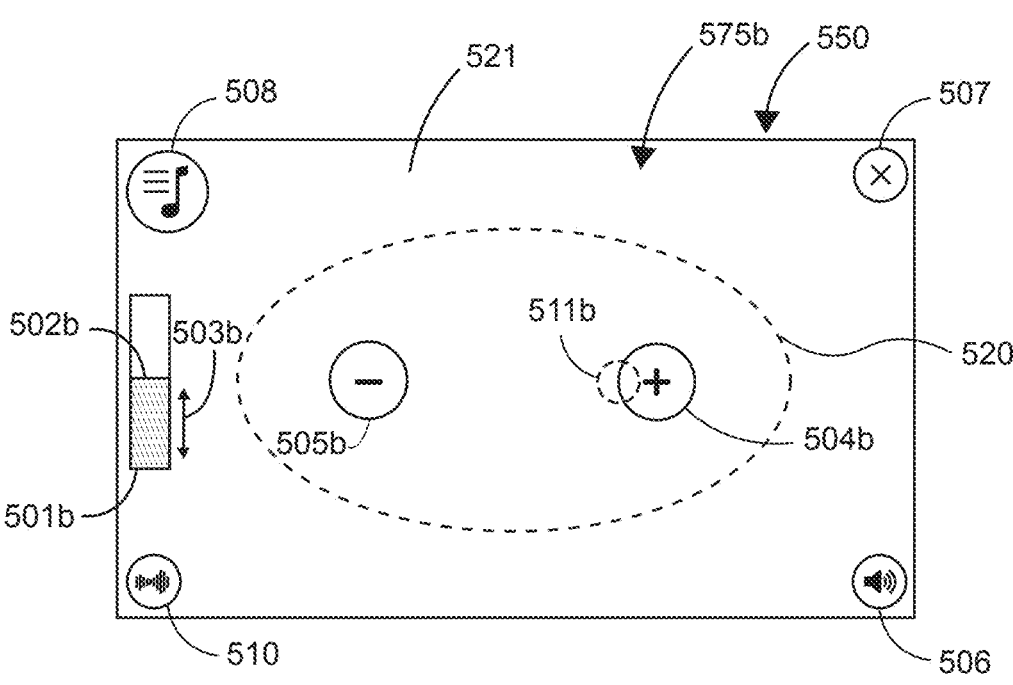

The example of FIG. 5B is similar to the example of FIG. 5A, except that the bar indicator 501b is displayed in a left area of the perifoveal region and can include slice 502b that changes vertically in size (and therefore exhibits movement of its boundaries). The direction of the movement of changes in size is indicated by arrows 503b. In one example, after the user's gaze 511b is determined to be directed at affordance 504b (e.g., the volume increase button) for a duration exceeding a threshold, the user's intended gaze-input selecting the affordance 504b can be confirmed. Following the confirmation, the slice 502b expands linearly to indicate increasing volume. Visually, the bar indicator 501b can appear to be filling in with an expanding slice 502b optionally having a different appearance (e.g., color) from the background user interface 575b. A similar change in the opposite direction (e.g., shrinking of slice 502b) can occur when a selection of affordance 505b is confirmed for a gaze directed at affordance 505b (e.g., the volume decrease button).

Figure 5C:
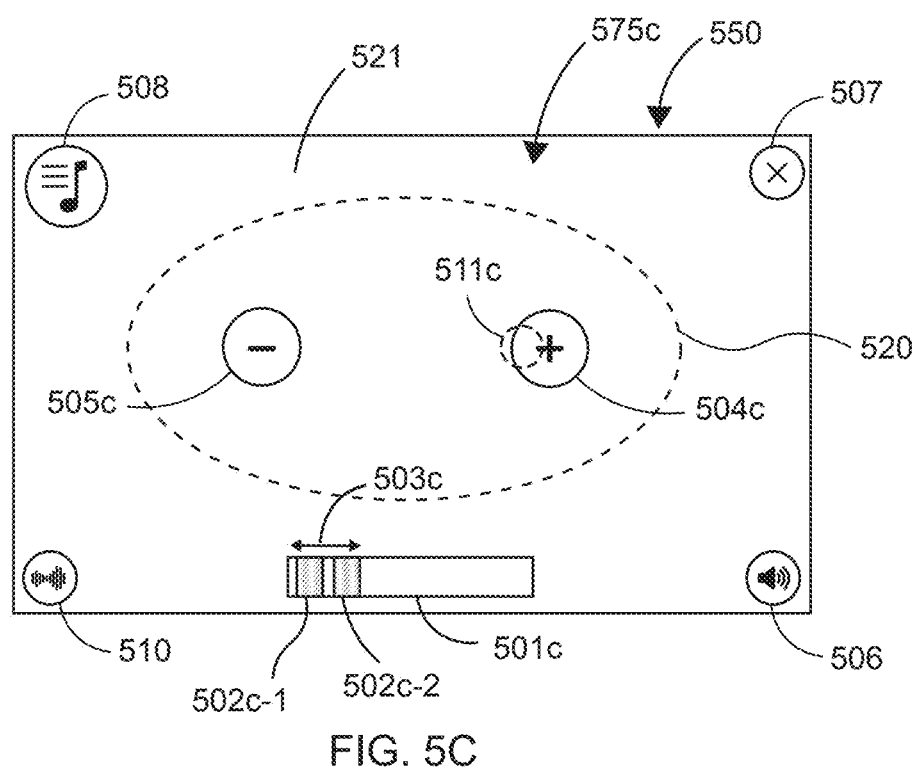

The example of FIG. 5C is similar to the example of FIG. 5A, except that the bar indicator 501c includes a slice formed from fixed segments 502c that appear or disappear in accordance with the adjustment of a parameter. Bar indicator 501c can exhibit changes to its appearance (e.g., changes to the total area of the slice as represented by the area of the displayed segments) as a result of gaze inputs provided in the foveal region and can provide a dynamic visual confirmation (or refutation) of an expected event while the user's gaze is directed to the foveal region. For example, bar indicator 501c can be associated with a volume decrease/increase event, and the sequential phasing in or out of the segments 502c-1, 502c-2, . . . , 502c-n (e.g., the sequential appearance or disappearance of the segments) can be noticed by a user as a dynamic confirmation or refutation of an expected volume change in a particular direction (e.g., a volume increase or decrease), even though the user's gaze is directed to the foveal region. The direction of the changes to its appearance is indicated by arrows 503c. In addition to the change in the number of slices or segments 502c, other changes to the appearance of the indicator can include motion of the indicator including any movements in any direction in a three-dimensional (3D) computer-generated environment, or changes to the size of some or all of the indicator (which can also be sensed as motion) In addition, bar indicator 501c can provide a static confirmation or refutation of the expected event when the user's gaze is redirected to the indicator itself.

In one example, after the user's gaze 511c is determined to be directed at affordance 504c (e.g., the volume increase button) for a duration exceeding a threshold, the user's intended gaze-input selecting the affordance 504c can be confirmed. Following the confirmation, the segments 502c-1, 502c-2, . . . , 502c-n of the slice sequentially phase into display (e.g., sequentially appear in an additive fashion) to indicate increasing volume. Visually, the slice within bar indicator 501c can appear to be expanding in area with segments 502c that optionally have a different appearance (e.g., color) from the background user interface 575c. In the example of FIG. 5C, the slice segments 502c-1, 502c-2, . . . , 502c-n may sequentially appear in an additive fashion in a horizontal direction for as long as the user's gaze 511c is determined to be directed at affordance 504c, or until a maximum volume level (e.g., 100%) is reached, at which time the sequential appearance of slice segments will stop. A similar change in the opposite direction (e.g., sequential phasing out of display of the corresponding slice segments) can occur when a selection of affordance 505c is confirmed for a gaze directed at affordance 505 (e.g., the volume decrease button). As noted above, even though bar indicator 501*c* is displayed outside the user's gaze in the perifoveal region, the change in the appearance of the indicator (e.g., updates to its appearance in the form of a larger or smaller slice area due to added or subtracted slice segments) can be visually recognized or sensed by the user. In the example of FIG. 5C, the user is able to recognize or sense the motion or the appearance changes associated with an appearance or disappearance of the slice segments 502*c*-1, 502*c*-2, . . . , 502*c*-*n* of bar indicator 501*c* and obtain feedback in the form of a confirmation or a refutation of the action intended by the user's gaze in the foveal region.

Figure 5D:
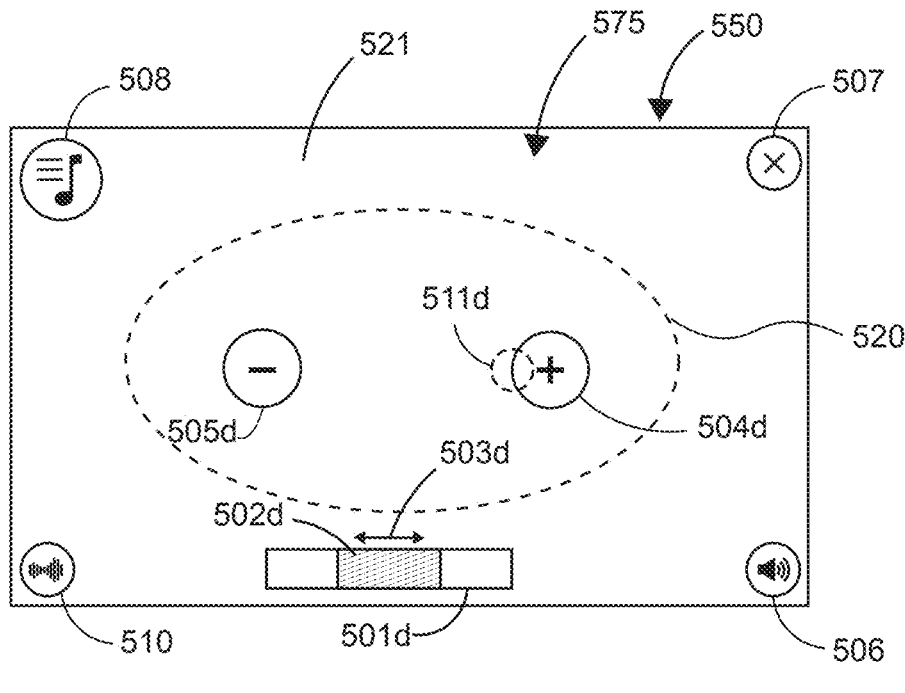

The example of FIG. 5D is similar to the example of FIG. 5A, except that the bar indicator includes a slice that changes location rather than changes its size. Bar indicator 501*d* can be displayed in the perifoveal region and can exhibit changes to its appearance as a result of gaze inputs provided in the foveal region and can provide a dynamic visual confirmation (or refutation) of an expected event while the user's gaze is directed to the foveal region. For example, bar indicator 501*d* can be associated with a volume decrease/increase event, and movement of slice 502*d* can be noticed by a user as a dynamic confirmation or refutation of an expected volume change in a particular direction (e.g., a volume increase or decrease), even though the user's gaze is directed to the foveal region. The direction of the movement is indicated by arrows 503*d*. In addition, bar indicator 501*d* can provide a static confirmation or refutation of the expected event when the user's gaze is redirected to the indicator itself.

In one example, after the user's gaze is directed at affordance 504*d* (e.g., the volume increase button), the user's gaze 511*d* is determined to be directed at affordance 504*d* (e.g., the volume increase button) for a duration exceeding a threshold, the user's intended gaze-input selecting the affordance 504*d* can be confirmed. Following the confirmation, the slice 502*d* can move linearly to indicate increasing volume. Visually, the bar indicator 501*d* can appear to be updating with a moving slice 502*d* optionally having a different appearance (e.g., color) from the background user interface 575*d*. In the example of FIG. 5D, the slice 502*d* may move in a horizontal direction for as long as the user's gaze 511*d* is determined to be directed at affordance 504*d*, or until a maximum volume level (e.g., 100%) is reached, at which time the movement of the slice will stop. A similar change in the opposite direction (e.g., movement of slice 502*d* in a reverse direction) can occur when a selection of affordance 505*d* is confirmed for a gaze directed at affordance 505*d* (e.g., the volume decrease button). As noted above, even though bar indicator 501*d* is displayed outside the user's gaze in the perifoveal region, the change to the appearance (e.g., motion) of the indicator can be visually recognized or sensed by the user. In the example of FIG. 5D, the user is able to recognize or sense the motion associated with a volume increase or decrease of the slice 502*d* of bar indicator 501*d* and obtain feedback in the form of a confirmation or a refutation of the action intended by the user's gaze in the foveal region.

Figure 5E:
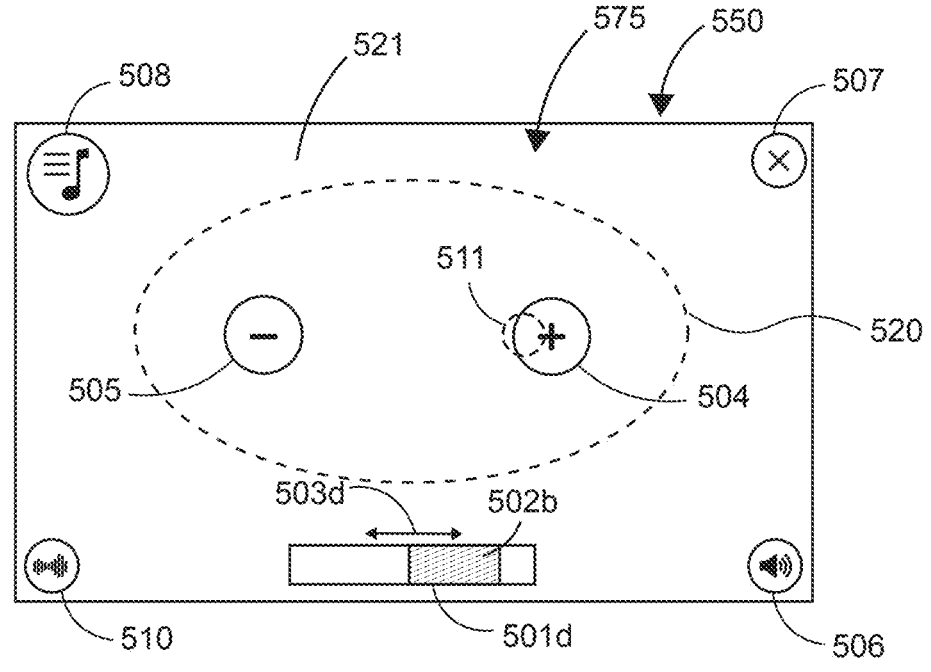
FIG. 5E depicts updates to the appearance of a bar indicator in a perifoveal region of a user interface for providing visual feedback on volume adjustment after the user's selection of a gaze-activated affordance that is displayed in a foveal region of a user interface is confirmed according to some examples of the disclosure.

FIG. 5E depicts updates to the appearance of a bar indicator in a perifoveal region of a user interface for providing visual feedback on volume adjustment after the user's selection of a gaze-activated affordance that is displayed in a foveal region of a user interface is confirmed according to some examples of the disclosure. For example, the changes to the user interface 575 include the movement of the slice 502*d* from its previous position in FIG. 5D.

Figure 6A:
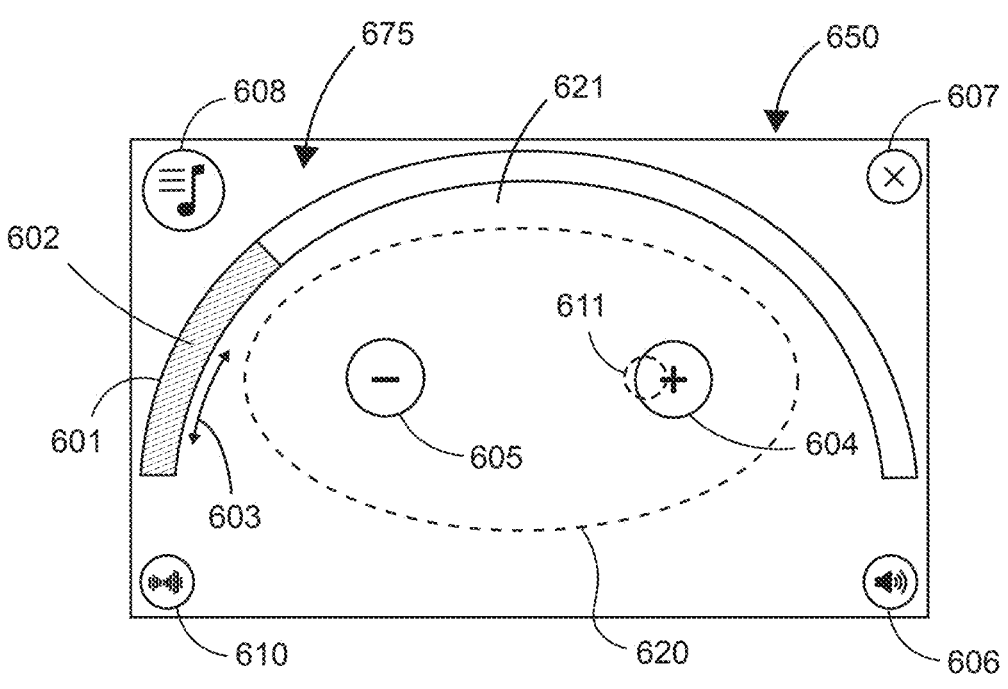
FIG. 6A illustrates a plurality of gaze-activated affordances in a foveal region of a user interface for volume adjustment along with an elliptical bar indicator in a perifoveal region of the user interface for providing visual feedback on the volume adjustment according to some examples of the disclosure.

FIG. 6A illustrates a plurality of gaze-activated affordances in a foveal region of a user interface for volume adjustment along with an elliptical bar indicator in a perifoveal region of the user interface for providing visual feedback on the volume adjustment according to some examples of the disclosure. As shown in FIG. 6A, an electronic device (e.g., the electronic device 201 of FIG. 2) displays a three-dimensional environment 650 that includes a plurality of user interface objects. The electronic device can concurrently display or present one or more affordances (e.g., one or more selectable buttons) in the foveal region 620 of the user interface and an indicator (e.g., an elliptical bar indicator) in the perifoveal region 621 outside of the foveal region. In the example of FIG. 6A, the one or more affordances and indicator can be associated with one or more volume adjustment events. For example, affordance 604 can be associated with a volume increase, and can be selectable to trigger a volume increase event. Affordance 605 can be associated with a volume decrease and can be selectable to trigger a volume decrease event.

Elliptical bar indicator 601 can feature an elliptical geometric characteristic and/or appearance, including an elliptical slice 602 that provides a visual indication of volume changes in either direction as indicated by arrow 603 due to the occurrence of volume increase or decrease events. Note that although indicator 601 and slice 602 are both in the shape of a partial ellipse in the example of FIG. 6A, the term "elliptical" will be used herein to describe indicators and slices having a partially elliptical shape. In operation, the elliptical slice 602 can increase in size in a particular direction (e.g., clockwise in the example of FIG. 6A, although the direction could be counterclockwise in other examples) within the elliptical bar indicator 601 when affordance 604 is selected as a result of a gaze input provided in the foveal region 620. Similarly, the elliptical slice 602 can decrease in size in the opposite direction within the elliptical bar indicator 601 when affordance 605 is selected as a result of a gaze input provided in the foveal region 620. In the example of FIG. 6A, the slice 602 can have a different color from the color of the background user interface 675. In some examples, the left and right ends of the elliptical bar indicator 601 correspond to 0% and 100% volume levels, respectively. Elliptical bar indicator 601 can provide a dynamic confirmation or refutation of an expected event while the user's gaze remains directed at the foveal region, and additionally a static confirmation or refutation of the expected event when the user's gaze is redirected to the indicator itself.

In one example, after the user's gaze 611 is determined to be directed at affordance 604 (e.g., the volume increase button) for a duration exceeding a threshold, the user's intended gaze-input selecting the affordance 604 can be confirmed. Following the confirmation, the slice 602 expands clockwise to indicate increasing volume. Visually, the indicator 601 can appear to be filling in with an expanding slice 602 optionally having a different appearance (e.g., color) from the background user interface 675. In the example of FIG. 6A, the slice 602 may expand in a clockwise direction for as long as the user's gaze 611 is determined to be directed at affordance 604, or until a maximum volume level (e.g., 100%) is reached, at which time the expansion of the slice will stop. A similar change in the opposite direction (e.g., counter-clockwise shrinking of slice 602) can occur when a selection of affordance 605 is confirmed for a gaze directed at affordance 605 (e.g., the volume decrease button). As noted above, even though elliptical bar indicator 601 is displayed outside the user's gaze in the perifoveal region, the change in the appearance of the indicator (e.g., the change in shape, size, or boundary of the indicator) can be visually recognized or sensed by the user (e.g., detected as movement). In the example of FIG. 6A, the user is able to recognize or sense the motion associated with a volume increase or decrease of the slice 602 of elliptical bar indicator 601 and obtain feedback in the form of a confirmation or a refutation of the action intended by the user's gaze in the foveal region.

Figure 6B:
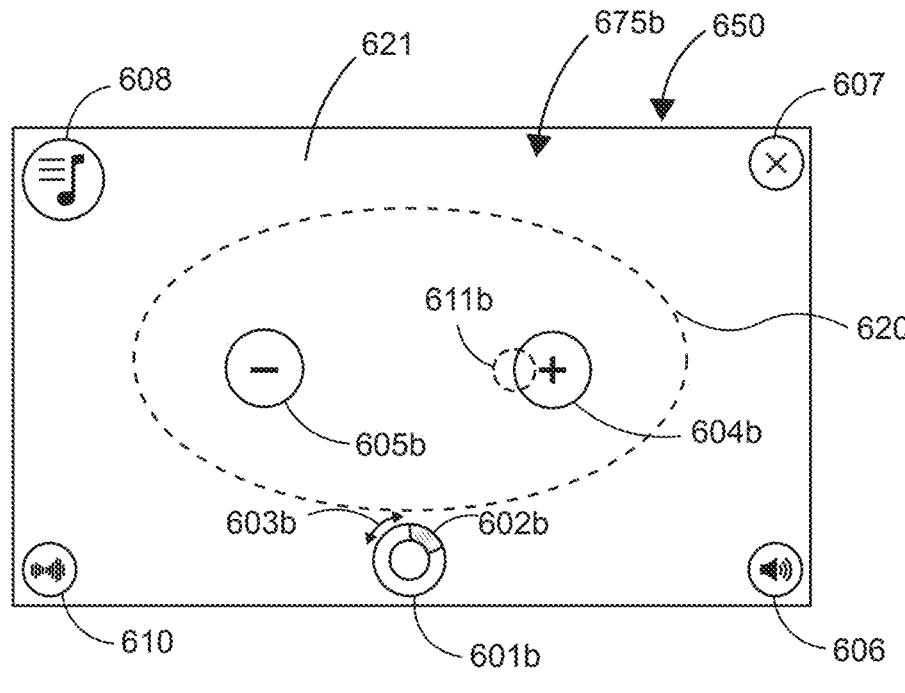
FIG. 6B illustrates a plurality of gaze-activated affordances in a foveal region of a user interface for volume adjustment along with a circular bar indicator in a perifoveal region of the user interface for providing visual feedback on the volume adjustment according to some examples of the disclosure.

FIG. 6B illustrates a plurality of gaze-activated affordances in a foveal region of a user interface for volume adjustment along with a circular bar indicator in a perifoveal region of the user interface for providing visual feedback on the volume adjustment according to some examples of the disclosure. As shown in FIG. 6B, an electronic device (e.g., the electronic device 201) displays a three-dimensional environment 650 that includes a plurality of user interface objects. For example, the electronic device can concurrently display or present one or more affordances (e.g., one or more selectable buttons) in the foveal region 620 of the user interface and an indicator (e.g., a circular bar indicator) in the perifoveal region 621 outside of the foveal region. In the example of FIG. 6B, the one or more affordances and indicator can be associated with one or more volume adjustment events. For example, affordance 604 can be associated with a volume increase, and can be selectable to trigger a volume increase event. Affordance 605 can be associated with a volume decrease and can be selectable to trigger a volume decrease event.

Circular bar indicator 601b can feature a circular geometric characteristic and/or appearance, including circular slice 602b that provide a visual indication of volume changes in either direction as indicated by arrows 603b due to the occurrence of volume increase or decrease events. Note that although slice 602b is in the shape of a partial circle in the example of FIG. 6B, the term 37 circular' will used herein to describe slices having a partially circular shape. In operation, the circular slice 602b can increase in size in a particular direction (e.g., clockwise in the examples of FIG. 6B, although the direction could be counterclockwise in other examples) within the circular bar indicator 601b when affordance 604b is selected as a result of a gaze input provided in the foveal region 620. Similarly, the circular slice 602b can decrease in size in the opposite direction within the circular bar indicator 601b when affordance 605b is selected as a result of a gaze input provided in the foveal region 620. In the example of FIG. 6B, the slice 602b can have a different color from the color of the background user interface 675. In some examples, the 12 o'clock position of indicator 601b and the 3 o'clock position of indicator 601c corresponds to 0% and 100% volume levels, respectively. Circular bar indicator 601b can provide a dynamic confirmation or refutation of an expected event while the user's gaze remains directed at the foveal region, and additionally a static confirmation or refutation of the expected event when the user's gaze is redirected to the indicator itself.

It should be understood that the example depicted in FIG. 6B showcases a circular bar indicator 601b that performs similarly to the elliptical bar indicator 601 in the example in FIG. 6A (e.g., the difference being the appearance of the circular indicator that otherwise performs the same as the elliptical bar indicator in FIG. 6A).

Figure 7A:
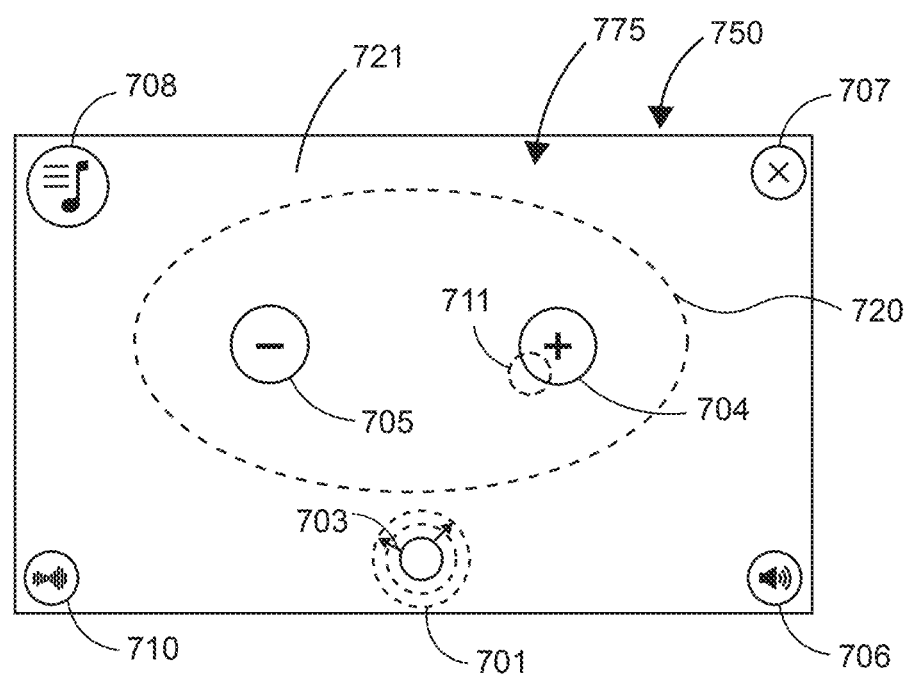
FIG. 7A illustrates a plurality of gaze-activated affordances in a foveal region of a user interface for volume adjustment along with a concentric-circles indicator in a perifoveal region of the user interface for providing visual feedback on the volume adjustment according to some examples of the disclosure.

FIG. 7A illustrates a plurality of gaze-activated affordances in a foveal region of a user interface for volume adjustment along with a concentric-circles indicator in a perifoveal region of the user interface for providing visual feedback on the volume adjustment according to some examples of the disclosure. As shown in FIG. 7A, an electronic device (e.g., the electronic device 201 of FIG. 2) displays a three-dimensional environment 750 that includes a plurality of user interface objects. For example, the electronic device can concurrently display or present one or more affordances (e.g., one or more selectable buttons) in the foveal region 720 of the user interface and an indicator (e.g., a concentric-circles indicator) in the perifoveal region 721 outside of the foveal region. In the example of FIG. 7A, the one or more affordances and indicator can be associated with one or more volume adjustment events. For example, affordance 704 can be associated with a volume increase, and can be selectable to trigger a volume increase event. Affordance 705 can be associated with a volume decrease and can be selectable to trigger a volume decrease event.

A concentric-circles indicator 701 can take on different forms. In some examples, such as in FIG. 7A, an indicator displayed in the perifoveal region can feature a circular geometric characteristic and/or appearance, including one or more concentric circles that can provide a dynamic visual confirmation (or refutation) of volume changes in either direction due to the occurrence of volume increase or decrease events. In operation, the concentric-circles indicator 701 can display an increasing number of concentric circles of increasing sizes (e.g., different radii) that are centered at the same point (e.g., concentric circles) as indicated by arrows 703 when affordance 704 is selected as a result of a gaze input provided in the foveal region 720. Similarly, the concentric-circles indicator 701 can display a decreasing number of concentric circles of decreasing sizes when affordance 705 is selected as a result of a gaze input provided in the foveal region 720. In the example of FIG. 7A, the concentric-circles of indicator 701 can have a different color from the color of the background user interface 775. In some examples, a concentric-circles indicator 701 that includes a predetermined plurality of concentric circles of varying sizes can correspond to a 100% volume level whereas a concentric-circles indicator 701 that includes one concentric circle in close proximity to and centered around the center point of the concentric-circles indicator 701 can correspond to a 0% volume level. Concentric-circles indicator 701 can provide a dynamic confirmation or refutation of an expected event while the user's gaze remains directed at the foveal region, and additionally a static confirmation or refutation of the expected event when the user's gaze is redirected to the indicator itself.

Figure 7B:
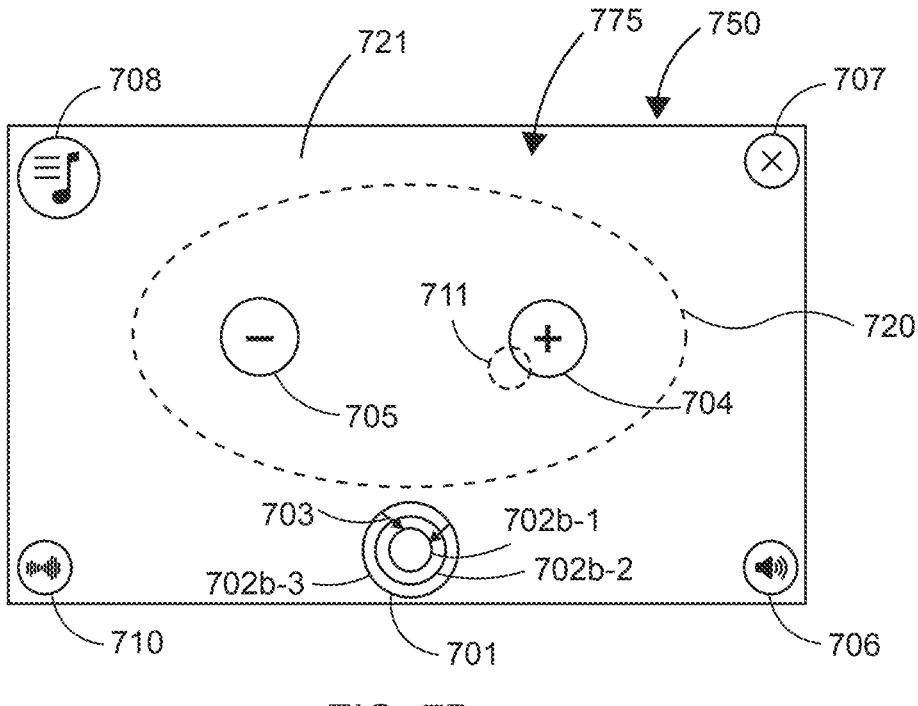
FIG. 7B depicts updates to the appearance of a concentric-circles indicator in a perifoveal region of a user interface for providing visual feedback on volume adjustment after the user's selection of a gaze-activated affordance that is displayed in a foveal region of a user interface is confirmed according to some examples of the disclosure.

FIG. 7B depicts updates to the appearance of a concentric-circles indicator in a perifoveal region of a user interface for providing visual feedback on volume adjustment after the user's selection of a gaze-activated affordance that is displayed in a foveal region of a user interface is confirmed according to some examples of the disclosure. The example of FIG. 7B is similar to the example of FIG. 7A, except that in FIG. 7B the concentric circles 702b-1, 702b-2, . . . , 702b-n have previously phased in (e.g., become visible) after the triggering of volume increase events, and are now phasing out. The direction of the changes to the appearance of the concentric-circles indicator 701 is exhibited by arrows 703. In the example of FIG. 7B, concentric-circles indicator 701 can be located in perifoveal region 721 and be associated with a volume decrease/increase event, and the sequential phasing into or out of display of the concentric circles 702b-1, 702b-2, . . . , 702b-n can be noticed by a user as a dynamic confirmation or refutation of an expected volume change in a particular direction (e.g., a volume increase or decrease), even though the user's gaze is directed to the foveal region. Additionally, concentric-circles indicator 701 can provide a static confirmation or refutation of the expected event when the user's gaze is redirected to the indicator itself.

In one example, after the user's gaze 711 is determined to be directed at affordance 704 (e.g., the volume increase button) for a duration exceeding a threshold, the user's intended gaze-input selecting the affordance 704 can be confirmed. Following the confirmation, the concentric circles 702*b*-1, 702*b*-2, . . . , 702*b-n* are sequentially phased into display to indicate increasing volume. Visually, the indicator 701 can appear to be filling in with concentric circles that can optionally have a different appearance (e.g., color) from the background user interface 775. In the example of FIG. 7B, the concentric circles 702*b*-1, 702*b*-2, . . . , 702*b-n* may be sequentially phased into the display in a radially expanding direction for as long as the user's gaze 711 is determined to be directed at affordance 704, or until a maximum volume level (e.g., 100%) is reached, at which time the sequential phasing into display of the concentric circles will stop. A similar change in the opposite direction (e.g., sequential phasing out of display of the corresponding concentric circles) can occur when a selection of affordance 705 is confirmed for a gaze directed at affordance 705 (e.g., the volume decrease button). As noted above, even though indicator 701 is displayed outside the user's gaze in the perifoveal region, the change in the appearance of the indicator (e.g., updates to its appearance in the form of added or subtracted concentric circles) can be visually recognized or sensed by the user. In the example of FIG. 7B, the user is able to recognize or sense the motion or the visual appearance changes associated with an appearance or disappearance of the concentric circles 702*b*-1, 702*b*-2, . . . , 702*b-n* of indicator 701, and obtain feedback in the form of a confirmation or a refutation of the action intended by the user's gaze in the foveal region.

Figure 7C:
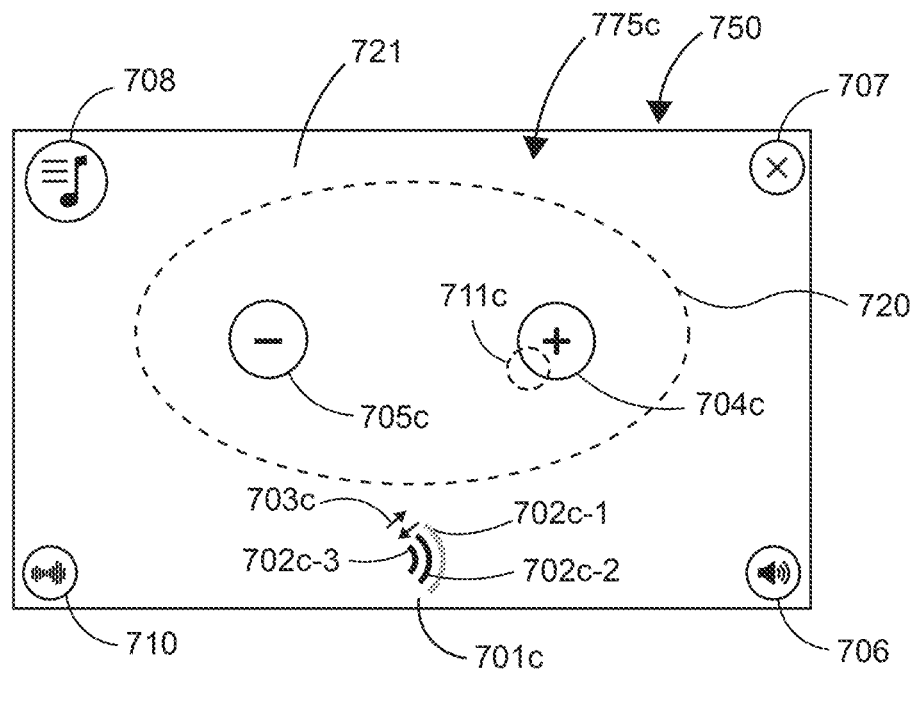
FIG. 7C illustrates a plurality of gaze-activated affordances in a foveal region of a user interface for volume adjustment along with a partial concentric-circles indicator in a perifoveal region of the user interface for providing visual feedback on the volume adjustment according to some examples of the disclosure.

FIG. 7C illustrates a plurality of gaze-activated affordances in a foveal region of a user interface for volume adjustment along with a partial concentric-circles indicator in a perifoveal region of the user interface for providing visual feedback on the volume adjustment according to some examples of the disclosure. The example of FIG. 7C is similar to the example of FIG. 7A, except that in FIG. 7C the partial concentric circles are always visible, but change their appearance (e.g., are highlighted or greyed out) in accordance with volume decrease/increase events. The direction of the changes to the appearance of the partial concentric-circles indicator 701*c* is exhibited by arrows 703*c*. In the example of FIG. 7C, partial concentric-circles indicator 701*c* can be located in perifoveal region 721 and be associated with a volume decrease/increase event, and the sequential emphasizing or deemphasizing of the partial concentric circles 702*c*-1, 702*c*-2, . . . , 702*c-n* can be noticed by a user as a dynamic confirmation or refutation of an expected volume change in a particular direction (e.g., a volume increase or decrease), even though the user's gaze is directed to the foveal region. Additionally, partial concentric-circles indicator 701*c* can provide a static confirmation or refutation of the expected event when the user's gaze is redirected to the indicator itself.

In one example, after the user's gaze 711*c* is determined to be directed at affordance 704*c* (e.g., the volume increase button) for a duration exceeding a threshold, the user's intended gaze-input selecting the affordance 704*c* can be confirmed. Following the confirmation, the partial concentric circles 702*c*-1, 702*c*-2, . . . , 702*c-n* are sequentially emphasized (e.g., changed from greyed out to sharp contrast, changed from dim to bright, changed from dark to increasingly bright colors, etc.) to indicate increasing volume. Visually, the indicator 701*c* can appear to be filling in with emphasized or highlighted corresponding partial concentric circles that have a different appearance (e.g., color) from the background user interface 775*c*. In the example of FIG. 7C, the partial concentric circles 702*c*-1, 702*c*-2, . . . , 702*c-n* may be sequentially emphasized in a radially expanding direction for as long as the user's gaze 711*c* is determined to be directed at affordance 704*c*, or until a maximum volume level (e.g., 100%) is reached, at which time the sequential emphasizing of the partial concentric circles will stop. A similar change in the opposite direction (e.g., sequential deemphasizing of the partial concentric circles) can occur when a selection of affordance 705*c* is confirmed for a gaze directed at affordance 705*c* (e.g., the volume decrease button). As noted above, even though indicator 701*c* is displayed outside the user's gaze in the perifoveal region, the change in the appearance of the indicator (e.g., updates to its appearance in the form of changes to the partial concentric circles) can be visually recognized or sensed by the user. In the example of FIG. 7C, the user is able to recognize or sense the motion or the changes to the appearance of the partial concentric circles 702*c*-1, 702*c*-2, . . . , 702*c-n* of indicator 701*c*, and obtain feedback in the form of a confirmation or a refutation of the action intended by the user's gaze in the foveal region.

Figure 8A:
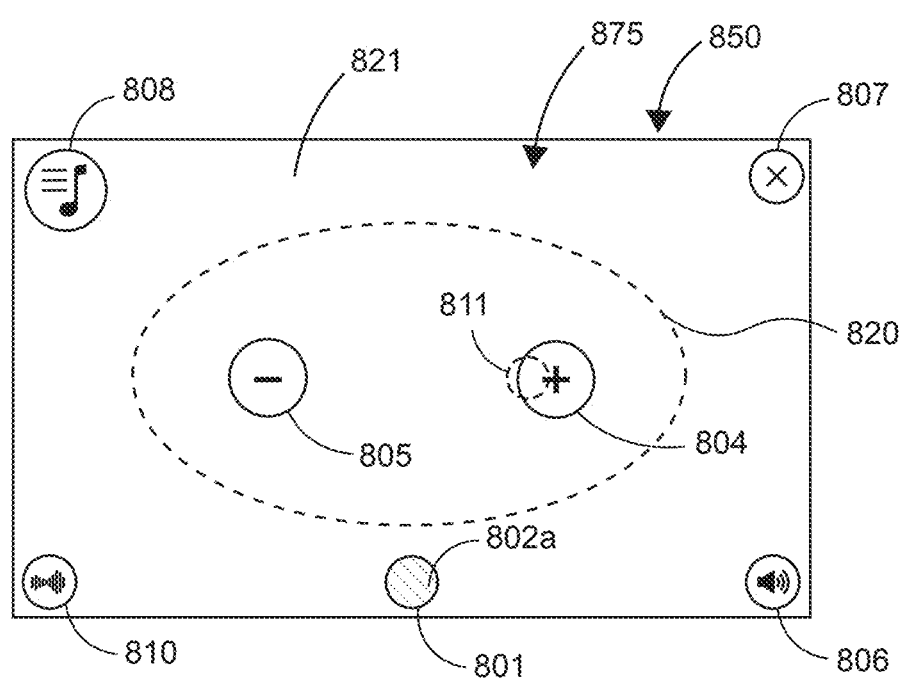
FIG. 8A illustrates a plurality of gaze-activated affordances in a foveal region of a user interface for volume adjustment along with a luminosity indicator in a perifoveal region of the user interface for providing visual feedback on the volume adjustment according to some examples of the disclosure.

FIG. 8A illustrates a plurality of gaze-activated affordances in a foveal region of a user interface for volume adjustment along with a luminosity indicator in a perifoveal region of the user interface for providing visual feedback on the volume adjustment according to some examples of the disclosure. As shown in FIG. 8A, an electronic device (e.g., the electronic device 201 of FIG. 2) displays a three-dimensional environment 850 that includes a plurality of user interface objects. For example, the electronic device can concurrently display or present one or more affordances (e.g., one or more selectable buttons) in the foveal region 820 of the user interface and an indicator (e.g., a luminosity indicator) 801 in the perifoveal region 821 outside of the foveal region. The one or more affordances and indicator can be associated with one or more volume adjustment events. For example, affordance 804 can be associated with a volume increase, and can be selectable to trigger a volume increase event. Affordance 805 can be associated with a volume decrease and can be selectable to trigger a volume decrease event.

The luminosity indicator 801 can take on many forms. In some examples, such as in FIG. 8A, a luminosity indicator 801 displayed in the perifoveal region 821 can feature a circular geometric characteristic and/or appearance, including a changing level of color and/or brightness (e.g., luminosity level 802*a*) that can provide a dynamic visual confirmation (or refutation) of volume changes in either direction due to the occurrence of volume increase or decrease events. In operation, the luminosity indicator 801 can increase the wavelength of light (e.g., towards red light) and/or increase the brightness of the indicator (e.g., increase the lumens of the light) when affordance 804 is selected as a result of a gaze input provided in the foveal regions 820. Similarly, the luminosity indicator 801 can display a decreasing wavelength of light (e.g., towards violet light) and/or decreasing the brightness of the indicator (e.g., decreasing the lumens of the light) when affordance 805 is selected as a result of a gaze input provided in the foveal region 820. The luminosity indicator 801 can have a different color and/or brightness from the color and/or brightness of the background user interface 875. In some examples, a luminosity indicator with a bright white luminosity can correspond to a 0% volume level and a luminosity indicator with a dark black luminosity can correspond to a 100% volume levels. Indicator 801 can change its appearance to provide a dynamic confirmation or refutation of an expected event while the user's gaze remains directed at the foveal region, and additionally a static confirmation or refutation of the expected event when the user's gaze is redirected to the indicator itself.

In one example, after the user's gaze 811 is determined to be directed at affordance 804 (e.g., the volume increase button) for a duration exceeding a threshold, the user's intended gaze-input selecting the affordance 804 can be confirmed. Following the confirmation, the color and/or luminosity level 802a of the luminosity indicator 801 changes to a higher wavelength color and/or a higher luminosity level to indicate increasing volume. Visually, the luminosity indicator 801 could appear to shift in color and/or brightness while having a different appearance (e.g., color) from the background user interface 875. In the example of FIG. 8A, the color and/or luminosity level 802a may change for as long as the user's gaze 811 is determined to be directed at affordance 804, or until a maximum volume level (e.g., 100%) is reached, at which time the updates to the color and/or luminosity level will stop. A similar change in the opposite direction (e.g., updating the color and/or luminosity level 802a to a lower wavelength of light and/or lower lumens) can occur when a selection of affordance 805 is confirmed for a gaze directed at affordance 805 (e.g., the volume decrease button). As noted above, even though luminosity indicator 801 is displayed outside the user's gaze in the perifoveal region, the change in appearance of the indicator (e.g., change in color or luminosity) can be visually recognized or sensed by the user. In the example of FIG. 8A, the user is able to recognize or sense the change in color and/or brightness associated with a volume increase or decrease of the luminosity level 802a of luminosity indicator 801 and obtain feedback in the form of a confirmation or a refutation of the action intended by the user's gaze in the foveal region.

Figure 8B:
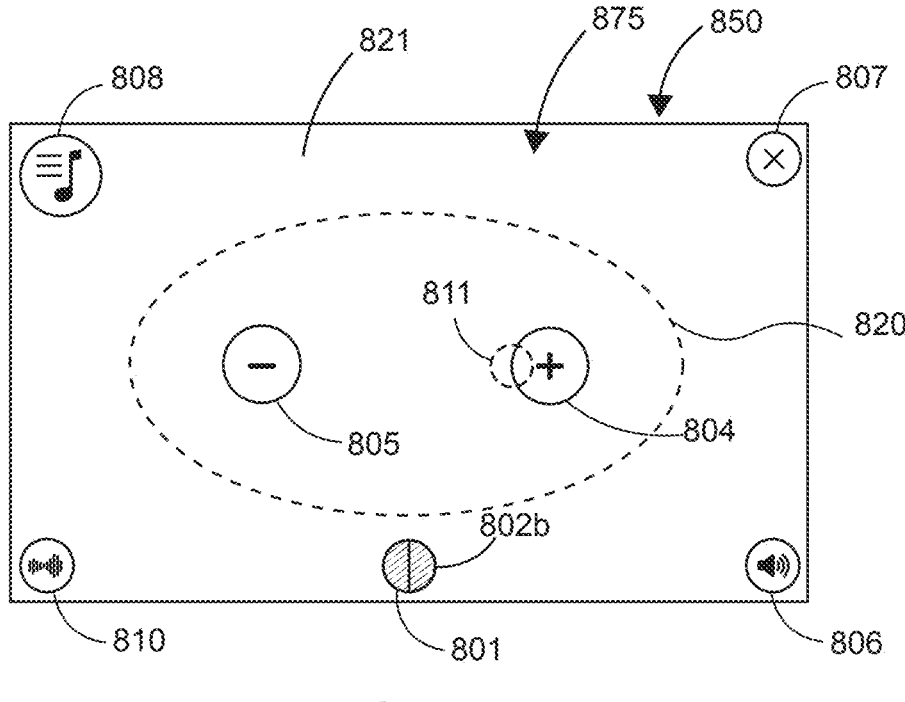
FIG. 8B depicts updates to the appearance of a luminosity indicator in a perifoveal region of a user interface for providing visual feedback on volume adjustment after the user's selection of a gaze-activated affordance that is displayed in a foveal region of a user interface is confirmed according to some examples of the disclosure.

FIG. 8B depicts updates to the appearance of a luminosity indicator in a perifoveal region of a user interface for providing visual feedback on volume adjustment after the user's selection of a gaze-activated affordance that is displayed in a foveal region of a user interface is confirmed according to some examples of the disclosure. For example, the changes to the user interface 875 include color and/or brightness changes of luminosity indicator 801 from its previous appearance in FIG. 8A (e.g., changing from luminosity level 802a to luminosity level 802b).

Additionally, although not shown in FIG. 8B, an electronic device (e.g., the electronic device 201 of FIG. 2) can concurrently display or present one or more gaze-activated affordances in the foveal region associated with adjusting the volume levels of the electronic device to pre-determined values. For example, following the confirmation of the user's intended gaze-input selecting an affordance associated with an event for adjusting volume levels to a predetermined value in a volume adjustment user interface, the electronic device sets the volume level to a pre-determined value (e.g., 100% value, 50% value or a 0% value corresponding to mute).

Figure 9:
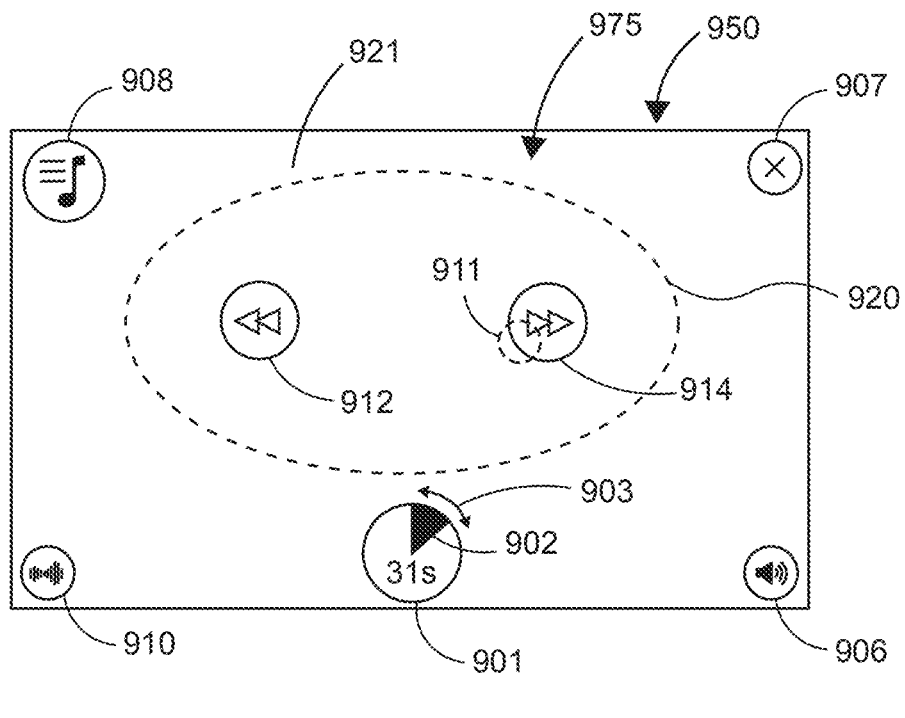
FIG. 9 illustrates a plurality of gaze-activated affordances in a foveal region of a user interface for rewind/fast forward along with a pie chart indicator in a perifoveal region of the user interface for providing visual feedback on the rewind/fast forward according to some examples of the disclosure.

FIG. 9 illustrates a plurality of gaze-activated affordances in a foveal region of a user interface for rewind/fast forward along with a pie chart indicator in a perifoveal region of the user interface for providing visual feedback on the rewind/fast forward according to some examples of the disclosure.

As shown in FIG. 9A, an electronic device (e.g., the electronic device 201 of FIG. 2) displays a three-dimensional environment 950 that includes a plurality of user interface objects. For example, affordance 914 can be displayed in the foveal region 920 and can be associated with fast forwarding an audio or video file and can be selectable to trigger a fast forward event. Affordance 912 can be associated with a rewinding the audio or video file and can be selectable to trigger a rewind event. The pie chart indicator 901 can be displayed in the perifoveal region 975 and can provide an indication of the progression or regression of a temporal position or time stamp. Indicator 901 can also provide feedback to the user in the form of a confirmation or a refutation of an intended rewind or fast-forward operation triggered by the user's gaze in the foveal region. In another example, an event can be associated with adjustments to treble and bass, or other sound attributes. Affordances 912 and 914 can trigger events to change those attributes, and indicator 901 can change its appearance to provide a confirmation or refutation of intended changes to those attributes. In another example, an event can be associated with adjustments to playing speed rather than temporal position. It should be understood that any configuration of indicators and affordances from examples demonstrated by FIGS. 3A-3B and 5A-8B can apply to the example shown in FIG. 9.

Additionally, in some examples, an indicator displayed in the perifoveal region can include alphanumeric information along with the indicator. For example, following the confirmation of the user's intended gaze-input, the alphanumeric information can change, in some instances along with a change to the appearance of the indicator, to indicate a parameter change associated with the event triggered by the user's gaze input. In the example of FIG. 9, a time position within the audio file (e.g., "31s" representing 31 seconds) can be displayed and updated within or proximate to the indicator 901. Although the indicator and alphanumeric information can be displayed outside the user's gaze in the perifoveal region, the detected change in appearance of the indicator (e.g., from the changing alphanumeric information) can be visually recognized or sensed by the user, and the user may be able to obtain feedback in the form of a confirmation or a refutation of the action intended by the user's gaze in the foveal region. Even in instances where the changes to the alphanumeric information cannot be observed with sufficient detail to provide a confirmation or refutation of intended user action while the user's gaze is directed to the foveal region, the alphanumeric information can be of value as a static confirmation or refutation of the expected event when the user's gaze is redirected to the indicator and alphanumeric information in the perifoveal region.

Figure 10:
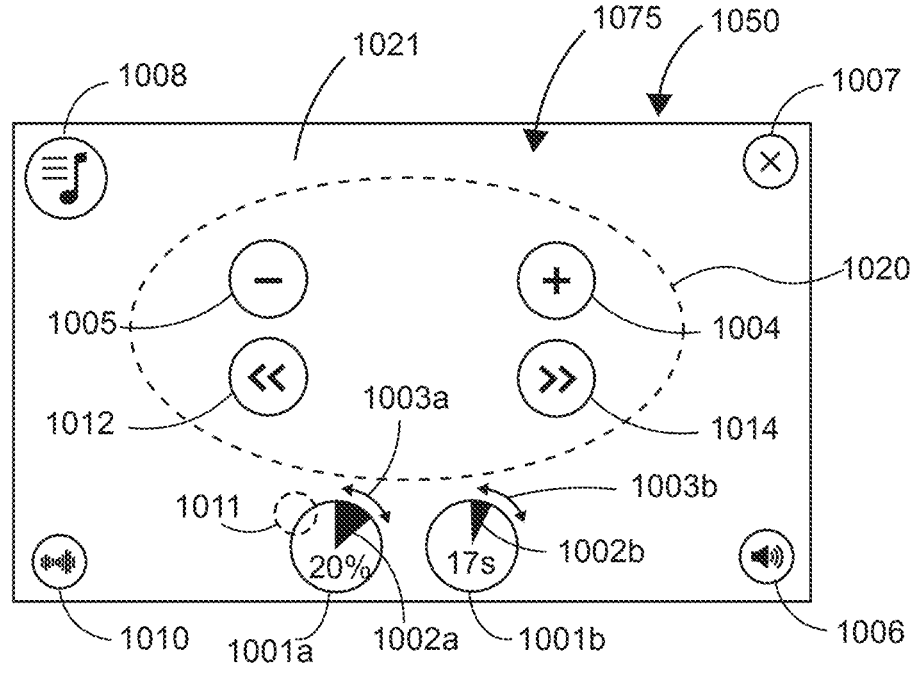
FIG. 10 illustrates a plurality of gaze-activated affordances in a foveal region of a user interface for volume adjustment and rewind/fast forward along with one pie chart indicator in a perifoveal region of the user interface for providing visual feedback on the volume adjustment and another pie chart indicator in the perifoveal region of the user interface for providing visual feedback on the rewind/fast forward according to some examples of the disclosure.

FIG. 10 illustrates a plurality of gaze-activated affordances in a foveal region of a user interface for volume adjustment and rewind/fast forward along with one pie chart indicator in a perifoveal region of the user interface for providing visual feedback on the volume adjustment and another pie chart indicator in the perifoveal region of the user interface for providing visual feedback on the rewind/fast forward according to some examples of the disclosure. More generally, the plurality of gaze-activated affordances can be associated with more than one event (e.g., one pair of affordances can be associated with the adjustment of one parameter and another pair of affordances can be associated with the adjustment of another parameter). For example, affordance 1004 can be associated with a volume increase and can be selectable to trigger a volume increase event. Affordance 1005 can be associated with a volume decrease and can be selectable to trigger a volume decrease event. Affordance 1014 can be associated with a fast forward event and can be selectable to trigger a fast forward event. Affordance 1012 can be associated with a rewind event and can be selectable to trigger a rewind event.

The pie chart indicator 1001*a* can be displayed in the perifoveal region and can be associated with a volume decrease/increase event and the progression of volume changes. Indicator 1001*a* can provide feedback to the user in the form of a confirmation or a refutation of the volume increase or decrease intended by the user's gaze input in the foveal region, even though the indicator is displayed outside the user's gaze in the perifoveal region. The pie chart indicator 1001*b* can be similarly displayed in the perifoveal region and can be associated with a rewind/fast forward event and the progression or regression of a temporal position or time stamp. Indicator 1001*b* can provide feedback to the user in the form of a confirmation or a refutation of the rewind or fast-forward intended by the user's gaze input in the foveal region, even though the indicator is displayed outside the user's gaze in the perifoveal region. It should be understood that any configuration of indicators and affordances from examples demonstrated by FIGS. 3A-3B and 5A-8B can apply to the example shown in FIG. 10.

Figure 11:
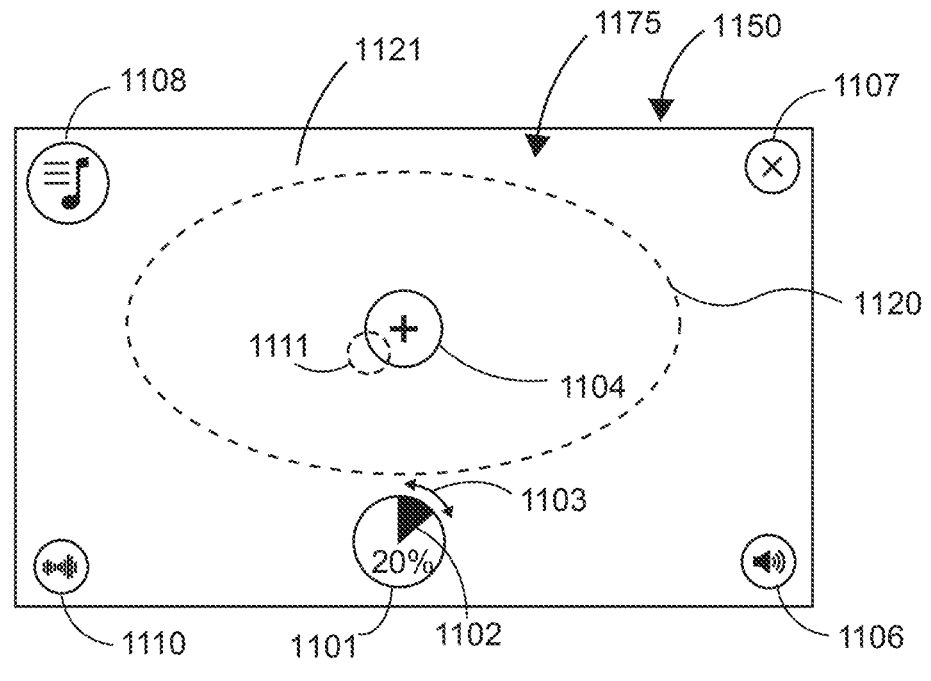
FIG. 11 illustrates a gaze-activated affordance in a foveal region of a user interface for volume adjustment along with a pie chart indicator in a perifoveal region of the user interface for providing visual feedback on the volume adjustment according to some examples of the disclosure.

FIG. 11 illustrates a gaze-activated affordance in a foveal region of a user interface for volume adjustment along with a pie chart indicator in a perifoveal region of the user interface for providing visual feedback on the volume adjustment according to some examples of the disclosure. In some examples, the electronic device displays one affordance in place of a pair of affordances. For example, affordance 1104 can be associated with a one-way volume adjustment (e.g., volume increases only), and the pie chart indicator 1101 can be displayed in the perifoveal region. Although one affordance 1104 is shown in the foveal region in the example of FIG. 11, in other examples three or more affordances can be displayed for adjusting one or more parameters, and one indicator can be displayed in the perifoveal region for each parameter being adjusted. In other examples, any configuration of indicators from examples demonstrated by FIGS. 3A-3B and 5A-8B can apply to the example shown in FIG. 11.

As noted above, in some examples, a multi-step sequence may be utilized to decrease the likelihood of accidental input(s) by requiring a series of deliberate and intentional steps before an action is initiated. For example, a multi-step sequence can include initially gazing at a virtual object (e.g., selecting the virtual object), then gazing at a secondary virtual object (e.g., selecting the secondary virtual object) to confirm an event and initiate an action. Referring again to FIG. 4, in some examples, user interfaces depicted in FIGS. 3A-3B and 5A-8B can be accessed after a multi-step sequence of gaze-based inputs. For example, if the starting user interface is user interface 475 of FIG. 4, after the user's intended gaze-input sequentially selecting the affordances, such as virtual objects 408 and 406 (in that order), is confirmed, user interface 375 of FIG. 3A can launch (e.g., replacing the presentation of user interface 475 of FIG. 4). Alternatively, in some examples, an intermediary user interface can be displayed in place of the starting user interface after confirming a first input. For example, in response to confirming the selection of an affordance (e.g., virtual object 408) of FIG. 4, the electronic device can replace the presentation of user interface 475 of FIG. 4 with the presentation of an intermediary user interface that does not include one or more affordances associated with a volume increase/ decrease event (e.g., different from the user interface 375 of FIG. 3A). Thereafter, in response to confirming the selection of an affordance (e.g., virtual object 406), the electronic device can transition to displaying user interface 375 of FIG. 3A. In some examples, the multi-step sequence can be configurable by the user. Alternatively, in some examples, the multi-step sequence can be a pre-determined factory setting. In this manner, a multi-step sequence can prevent a user from inadvertently gazing at an affordance (e.g., virtual object 406) in the user interface of FIG. 4 and immediately but unintentionally launching a volume adjustment user interface.

As previously discussed, the user can direct gaze at a gaze-activated affordance associated with an event to intentionally trigger the event. In response to receiving the user's gaze-based input directed at a gaze-activated affordance for a duration exceeding a threshold, an electronic device (e.g., the electronic device 201 of FIG. 2) can confirm the selection of the gaze-activated affordance. Additionally, in some examples, if the user maintains their gaze directed at the gaze-activated affordance, the selection of the affordance can be continuously confirmed, and the event associated with the affordance can be continuously triggered, resulting in repeated state changes (e.g., repeated changes to a parameter). For example, in FIG. 3A, the user can direct their gaze 311 at affordance 304 to trigger a volume increase event. In response to the gaze 311, the selection of the affordance 304 can be confirmed, and in response to the confirmation, the volume increase event can trigger, and the volume can be increased by a predetermined amount. If the user maintains their gaze 311 at affordance 304, the volume increase event can continue to trigger, and the volume can be incrementally increased by the predetermined amount.

As previously discussed, an indicator located in the perifoveal region of a user interface can allow a user to obtain a confirmation or refutation of their intended gaze input being provided in the foveal region, even while the user's gaze remains fixed in the foveal region. It has also been mentioned the indicator can also serve as a static confirmation or refutation of the user's intended gaze input when the user redirects their gaze to the indicator. For example, with reference to the example shown in FIG. 3A, during the display of the user interface 375 and after a volume increase/ decrease event has been triggered, the user can divert their gaze 311 to the pie chart indicator 301 to monitor or pause volume adjustment(s) and confirm the adjustment(s) thus far. Because the user's gaze 311 is no longer directed at affordances 304 or 305, but rather to indicator 301, volume adjustments are paused, and the indicator becomes static (unchanged). During this time, the user can "rest" (e.g., observe without concern that a gaze will trigger an event) and look more carefully look at the indicator to determine the current volume setting, and in some instances read alphanumeric information (e.g., "20%" in the example of FIG. 3A) that may not have been discernable while gazing at the foveal region. After an assessment of the current volume setting, the user can either redirect their gaze 311 back to the affordances 304 or 305 to continue adjustments or exit the volume adjustment user interface (via gazing at affordance, such as virtual object 307) if the volume setting is satisfactory.

As mentioned above, in some examples, confirming the selection of any gaze-activated affordance is contingent on receiving user's gaze-based input directed at a given affordance for a duration exceeding a threshold time. A longer time threshold can reduce false inputs by preventing the triggering of an event when a user glances at an affordance for a short time period that is less than the threshold without intending to actually trigger the event associated with the affordance. However, a longer time threshold can also reduce the agility and responsiveness of the user interface. In some examples, the time threshold is equivalent to 200 milliseconds (ms). In the example of FIG. 3A, if a user's gaze 311 is directed to affordance 304 and persists for 200 ms or greater, the selection of the affordance 304 can be confirmed. In some examples, consecutive selections of the affordance 304 can be confirmed after waiting additional increments of 200 ms. However, in other examples, consecutive selections of the affordance 304 can be confirmed after time periods shorter than 200 ms (e.g., 50 ms), because the continued persistence of gaze beyond 200 ms (e.g., a total gaze persistence of 250 ms, a total gaze persistence of 300 ms, etc.) can be interpreted as an even stronger confirmation of user intent.

Additionally, in some examples, the amount of adjustment associated with an event can be implemented by a percentage change rather than a fixed amount. Utilizing FIG. 3A as an example, if the user's gaze 311 is directed to affordance 304 and persists for 200 ms, the volume of the electronic device 201 can increase by one percent of the current volume (or some other predetermined or configurable percentage), rather than by a fixed 5 db (or some other predetermined or configurable amount). In some examples, the amount of change, or alternatively the amount of the percentage change of the parameter associated with the event can be dependent on the persistence of the gaze-based inputs. In other words, if the user consistently gazes at the volume increase affordance 304, the amount of change in volume gradually increases (e.g., increases by 5 db to 10 db to 15 db), or alternatively the amount of percentage change in volume gradually increases (e.g., from one percent to two percent to five percent). Alternatively or additionally, in some examples, the time threshold required for receiving the user's gaze-based input directed at a given affordance can reduce over consecutive confirmations of an event (e.g., from 200 ms to 100 ms to 50 ms). In some examples, the threshold time is a pre-determined factory setting.

Figure 12:
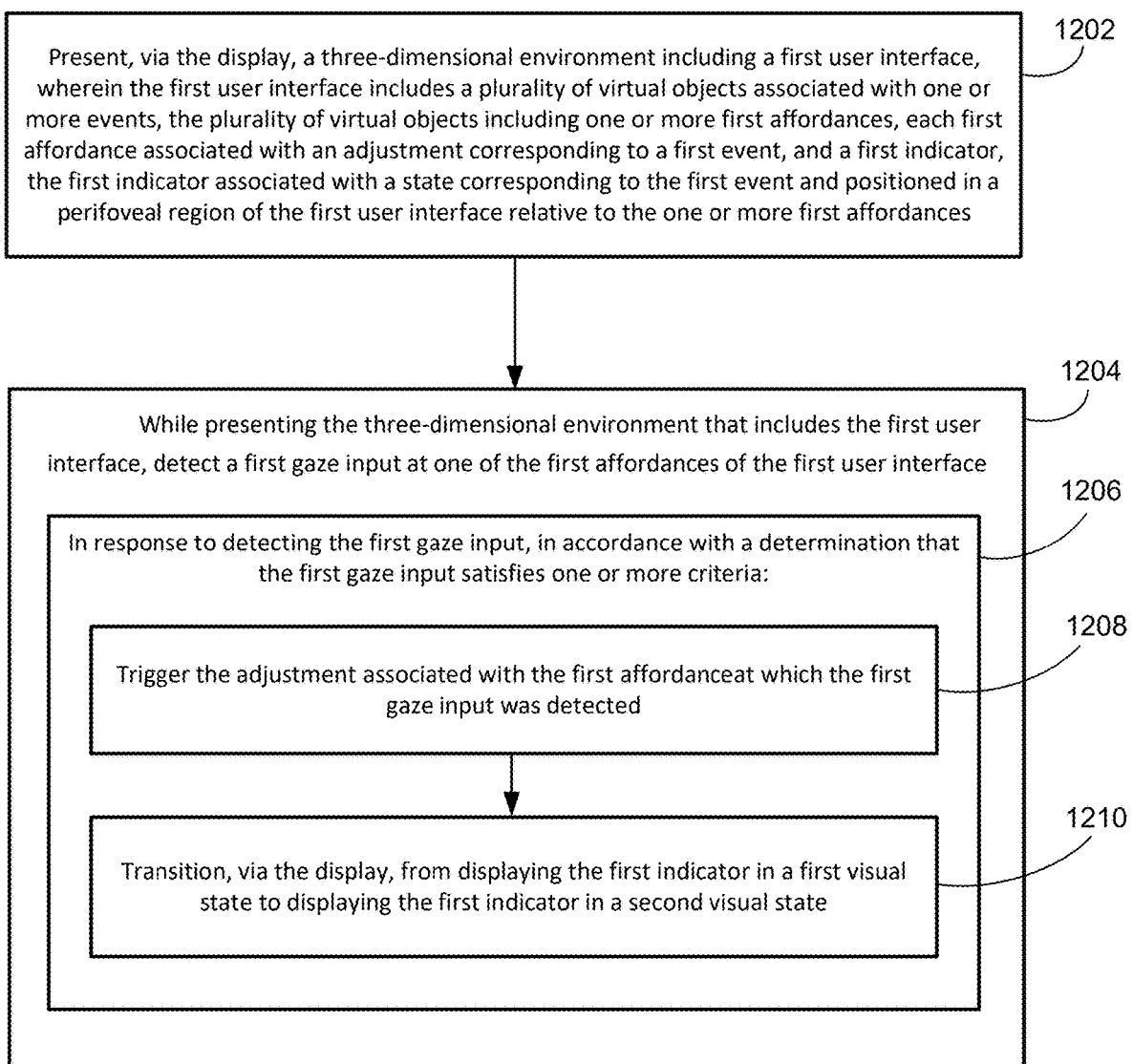
FIG. 12 is a flow diagram illustrating an example process for displaying user interfaces associated with gaze-activated affordances in a foveal region of a user interface for triggering an adjustment along with an indicator in a perifoveal region of the user interface for providing visual feedback on the adjustment according to some examples of the disclosure.

FIG. 12 is a flow diagram illustrating an example process for displaying user interfaces associated with gaze-activated affordances in a foveal region of a user interface for triggering an adjustment along with an indicator in a perifoveal region of the user interface for providing visual feedback on the adjustment according to some examples of the disclosure. In some examples, process 1200 begins at an electronic device in communication with a display and one or more input devices. In some examples, the electronic device is optionally a head-mounted display similar or corresponding to electronic device 201 of FIG. 2. As shown in FIG. 12, in some examples, at 1202, the electronic device presents, via the display, a three-dimensional environment including a first user interface, wherein the first user interface includes a plurality of virtual objects associated with one or more events, the plurality of virtual objects including one or more first affordances, each first affordance associated with an adjustment corresponding to the first event, and a first indicator, the first indicator associated with a state corresponding to the first event and positioned in a perifoveal region of the first user interface relative to the one or more first affordances. For example, the electronic device presents a three-dimensional environment, such as three-dimensional environment 350 in FIG. 3A, that includes a plurality of virtual objects such as indicator 301 and affordances 304 and 305, which are associated with a volume adjustment.

In some examples, at 1204, while presenting the three-dimensional environment that includes the first user interface, the electronic device detects a first gaze input at one of the first affordances of the first user interface. In response to detecting the first gaze input, in accordance with a determination that the first gaze input satisfies one or more criteria at 1206, the electronic device triggers the adjustment associated with the first affordance at which the first gaze input was detected at 1208 and transitions, via the display, from displaying the first indicator in a first visual state to displaying the first indicator in a second visual state at 1210. For example, as shown in FIG. 3A, the electronic device detects the gaze 311 at affordance 304 in user interface 375, and in response to detecting gaze 311, if the gaze 311 is persistent at affordance 304 exceeding a time threshold and the selection of affordance 304 is confirmed, the electronic device triggers a volume increase adjustment and the area of the slice 302 in pie chart indicator 301 increases in the clockwise direction (e.g., corresponding to arrows 303), thereby transitioning from displaying the pie chart indicator 301 at 20 percent.

It is understood that process 1200 is an example and that more, fewer, or different operations can be performed in the same or in a different order. Additionally, the operations in process 1200 described above are, optionally, implemented by running one or more functional modules in an information processing apparatus such as general-purpose processors (e.g., as described with respect to FIG. 2) or application specific chips, and/or by other components of FIG. 2.

FIG. 13 is a flow diagram illustrating an example process for displaying user interfaces associated with gaze-activated affordances in a foveal region of a user interface for triggering an event along with an indicator in a perifoveal region of the user interface for providing visual feedback on the event according to some examples of the disclosure. In some examples, process 1300 begins at an electronic device in communication with a display and one or more input devices. In some examples, the electronic device is optionally a head-mounted display similar or corresponding to electronic device 201 of FIG. 2. As shown in FIG. 13, in some examples, at 1302, while presenting, via a display, a three-dimensional environment including a user interface, the electronic device detects, via one or more input devices, a first gaze-based input directed to a first affordance in a foveal region of the user interface. For example, while presenting a three-dimensional environment, such as three-dimensional environment 350 that includes user interface 375 in FIG. 3A, the electronic device detects gaze 311 directed to affordance 304, which is displayed in foveal region 320.

In some examples, at 1304, the electronic device confirms the selection of the first affordance, wherein the first affordance is associated with a first event. For example, as shown in FIG. 3A, the electronic device confirms selection, after the persistence of gaze 311 exceeding a time threshold, of affordance 304, which is associated with a volume increase event. In some examples, at 1306, in response to confirming the selection of the first affordance, the electronic device triggers the event associated with the first affordance at 1308, and updates the appearance of a first indicator in a perifoveal region of the user interface at 1310. For example, as shown in FIG. 3A, in response to confirming the selection of affordance 304, the electronic device triggers the volume increase event and updates the appearance of indicator 301 in perifoveal region 321.

It is understood that process 1300 is an example and that more, fewer, or different operations can be performed in the same or in a different order. Additionally, the operations in process 1300 described above are, optionally, implemented by running one or more functional modules in an information processing apparatus such as general-purpose processors (e.g., as described with respect to FIG. 2) or application specific chips, and/or by other components of FIG. 2.

Therefore, some examples of the disclosure are directed to a method comprising, at an electronic device in communication with one or more displays and one or more input devices, presenting, via the one or more displays, a three-dimensional environment including a first user interface, wherein the first user interface includes a plurality of virtual objects associated with one or more events, the plurality of virtual objects including one or more first affordances, each first affordance associated with an adjustment corresponding to a first event, and a first indicator, the first indicator associated with a state corresponding to the first event and positioned in a perifoveal region of the first user interface relative to the one or more first affordances, while presenting the three-dimensional environment that includes the first user interface, detecting a first gaze input at one of the first affordances of the first user interface, and in response to detecting the first gaze input, in accordance with a determination that the first gaze input satisfies one or more criteria, triggering the adjustment associated with the first affordance at which the first gaze input was detected and transitioning, via the one or more displays, from displaying the first indicator in a first visual state to displaying the first indicator in a second visual state. Additionally or alternatively to one or more of the examples described above, in some examples the one or more first affordances are positioned in a foveal region of the first user interface. Additionally or alternatively to one or more of the examples described above, in some examples the foveal region encompasses the one or more first affordances. Additionally or alternatively to one or more of the examples described above, in some examples the foveal region is within a 3 degree diameter of the one or more first affordances. Additionally or alternatively to one or more of the examples described above, in some examples the perifoveal region is between the 3 degree diameter and a 15 degree diameter of the one or more first affordances. Additionally or alternatively to one or more of the examples described above, in some examples the first indicator is positioned such that it appears in a perifovea of a user's retina when user gaze is directed to one of the one or more first affordances. Additionally or alternatively to one or more of the examples described above, in some examples the perifoveal region is an area of the first user interface that extends beyond the foveal region. Additionally or alternatively to one or more of the examples described above, in some examples the perifoveal region of the first user interface is located such that the transitioning of the first indicator from the first visual state to the second visual state is detectable by a user while the first gaze input is directed to one of the first affordances in the foveal region of the first user interface. Additionally or alternatively to one or more of the examples described above, in some examples the perifoveal region of the first user interface is located such that a change in appearance of the first indicator while transitioning from the first visual state to the second visual state is detectable by the user while the first gaze input is directed to one of the first affordances in the foveal region of the first user interface. Additionally or alternatively to one or more of the examples described above, in some examples a change in the first indicator while transitioning from the first visual state to the second visual state comprises movement of at least a portion of the first indicator in the three-dimensional environment. Additionally or alternatively to one or more of the examples described above, in some examples a change in the first indicator while transitioning from the first visual state to the second visual state comprises a change in an area of at least a portion of the first indicator in the three-dimensional environment. Additionally or alternatively to one or more of the examples described above, in some examples a change in the first indicator while transitioning from the first visual state to the second visual state comprises a change in a size of the first indicator. Additionally or alternatively to one or more of the examples described above, in some examples a change in the first indicator while transitioning from the first visual state to the second visual state comprises a change in a shape of at least a portion of the first indicator. Additionally or alternatively to one or more of the examples described above, in some examples a change in the first indicator while transitioning from the first visual state to the second visual state comprises a change in color of at least a portion of the first indicator. Additionally or alternatively to one or more of the examples described above, in some examples a change in the first indicator while transitioning from the first visual state to the second visual state comprises a change in brightness of at least a portion of the first indicator. Additionally or alternatively to one or more of the examples described above, in some examples the one or more first affordances comprise two first affordances, each of the two first affordances having a circular shape and separated by a factor of three times the diameter of one of the two first affordances. Additionally or alternatively to one or more of the examples described above, in some examples the method further comprises presenting, via the one or more displays and prior to the presenting of the first user interface, a second user interface in the three-dimensional environment, while presenting the second user interface, detecting a sequence of one or more second gaze inputs at the second user interface, and in response to detecting the sequence of the one or more second gaze inputs, presenting the first user interface. Additionally or alternatively to one or more of the examples described above, in some examples the first indicator is presented in a first location in the perifoveal region of the user interface, the first location selected such that the transitioning of the first indicator from the first visual state to the second visual state is detectable by a user while the first gaze input is directed to one of the first affordances in the foveal region of the first user interface. Additionally or alternatively to one or more of the examples described above, in some examples the first user interface includes one or more second affordances, different from the one or more first affordances, each second affordance associated with an adjustment corresponding to a second event, and a second indicator, different from the first indicator, the second indicator associated with a state corresponding to the second event. Additionally or alternatively to one or more of the examples described above, in some examples the first user interface includes one or more second affordances, different from the one or more first affordances, each second affordance associated with an adjustment to a predetermined value corresponding to the first event. Additionally or alternatively to one or more of the examples described above, in some examples a rate of change of the adjustment corresponding to the first event is based on a persistence of the first gaze input at one of the first affordances. Additionally or alternatively to one or more of the examples described above, in some examples an amount of the adjustment corresponding to the first event is based on a persistence of the first gaze input at one of the first affordances. Additionally or alternatively to one or more of the examples described above, in some examples the first event is associated with a volume increase or decrease of the electronic device. Additionally or alternatively to one or more of the examples described above, in some examples the first event is associated with a playing speed increase or decrease of the electronic device. Additionally or alternatively to one or more of the examples described above, in some examples the first event is associated with progression or regression of a temporal position or time stamp. Additionally or alternatively to one or more of the examples described above, in some examples the first indicator is a pie chart indicator. Additionally or alternatively to one or more of the examples described above, in some examples the first indicator is a dial indicator. Additionally or alternatively to one or more of the examples described above, in some examples the first indicator is a bar indicator. Additionally or alternatively to one or more of the examples described above, in some examples the first indicator is a concentric-circles indicator. Additionally or alternatively to one or more of the examples described above, in some examples the first indicator is a luminosity indicator. Additionally or alternatively to one or more of the examples described above, in some examples the one or more criteria include detecting the first gaze input for an amount of time that exceeds a first threshold. Additionally or alternatively to one or more of the examples described above, in some examples the first indicator includes a virtual object in the shape of a slice. Additionally or alternatively to one or more of the examples described above, in some examples the area of the slice increases in a predetermined direction after the triggering of the event. Additionally or alternatively to one or more of the examples described above, in some examples the area of the slice decreases in a predetermined direction after the triggering of the event.

Some examples of the disclosure are directed to an electronic device. In some examples an electronic device comprises one or more processors, memory, and one or more programs stored in the memory and configured to be executed by the one or more processors, the one or more programs including instructions for performing a method of one or more of the examples disclosed above. Some examples of the disclosure are directed to a non-transitory computer readable storage medium. In some examples, a non-transitory computer readable storage medium stores one or more programs, the one or more programs comprising instructions, which when executed by one or more processors of an electronic device, cause the electronic device to perform a method of one or more of the examples disclosed above. Some examples of the disclosure are directed to an electronic device. In some examples, an electronic device comprises one or more processors, memory, and means for performing a method of one or more of the examples disclosed above. Some examples of the disclosure are directed to an information processing apparatus. In some examples an information processing apparatus for use in an electronic device comprises means for performing a method of one or more of the examples disclosed above.

The foregoing description, for purposes of explanation, has been described with reference to specific examples. However, the illustrative discussions above are not intended to be exhaustive or to limit examples of the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

The invention claimed is:

1. A method comprising:
at an electronic device in communication with one or more displays and one or more input devices:
presenting, via the one or more displays, a three-dimensional environment including a first user interface, wherein the first user interface includes a plurality of virtual objects associated with one or more events, the plurality of virtual objects including one or more first affordances, each first affordance associated with an adjustment corresponding to a first event, and a first indicator, the first indicator associated with a state corresponding to the first event and positioned in a perifoveal region of the first user interface relative to the one or more first affordances;
while presenting the three-dimensional environment that includes the first user interface, detecting a first gaze input at one of the first affordances of the first user interface; and
in response to detecting the first gaze input,
in accordance with a determination that the first gaze input satisfies one or more criteria, triggering the adjustment associated with the first affordance at which the first gaze input was detected and transitioning, via the one or more displays, from displaying the first indicator in a first visual state to displaying the first indicator in a second visual state.

2. The method of claim 1, wherein the one or more first affordances are positioned in a foveal region of the first user interface.

3. The method of claim 1, wherein the first indicator is positioned such that it appears in a perifovea of a user's retina when user gaze is directed to one of the one or more first affordances.

4. The method of claim 1, wherein the perifoveal region of the first user interface is located such that the transitioning of the first indicator from the first visual state to the second visual state or a change in appearance of the first indicator while transitioning from the first visual state to the second visual state is detectable by a user while the first gaze input is directed to one of the first affordances in a foveal region of the first user interface.

5. The method of claim 4, wherein a change in the first indicator while transitioning from the first visual state to the second visual state comprises one or more of:
movement of at least a portion of the first indicator in the three-dimensional environment;
a change in an area of at least a portion of the first indicator in the three-dimensional environment;
a change in a size of the first indicator;
a change in a shape of at least a portion of the first indicator;
a change in color of at least a portion of the first indicator; or
a change in brightness of at least a portion of the first indicator.

6. The method of claim 1, wherein the one or more first affordances comprise two first affordances, each of the two first affordances having a circular shape and separated by a factor of three times a diameter of one of the two first affordances.

7. The method of claim 1, wherein an amount of the adjustment corresponding to the first event or a rate of change of the adjustment corresponding to the first event is based on a persistence of the first gaze input at one of the first affordances.

8. The method of claim 1, wherein the one or more criteria include detecting the first gaze input for an amount of time that exceeds a first threshold.

9. An electronic device in communication with one or more displays and one or more input devices, the electronic device comprising:
one or more processors;
memory; and
one or more programs stored in the memory and config-ured to be executed by the one or more processors, the one or more programs including instructions for:
presenting, via the one or more displays, a three-dimensional environment including a first user inter-face, wherein the first user interface includes a plurality of virtual objects associated with one or more events, the plurality of virtual objects including one or more first affordances, each first affordance associated with an adjustment corresponding to a first event, and a first indicator, the first indicator associated with a state corresponding to the first event and positioned in a perifoveal region of the first user interface relative to the one or more first affordances;
while presenting the three-dimensional environment that includes the first user interface, detecting a first gaze input at one of the first affordances of the first user interface; and
in response to detecting the first gaze input,
in accordance with a determination that the first gaze input satisfies one or more criteria, triggering the adjustment associated with the first affordance at which the first gaze input was detected and tran-sitioning, via the one or more displays, from displaying the first indicator in a first visual state to displaying the first indicator in a second visual state.

10. The electronic device of claim 9, wherein the one or more first affordances are positioned in a foveal region of the first user interface.

11. The electronic device of claim 9, wherein the first indicator is positioned such that it appears in a perifovea of a user's retina when user gaze is directed to one of the one or more first affordances.

12. The electronic device of claim 9, wherein the perifo-veal region of the first user interface is located such that the transitioning of the first indicator from the first visual state to the second visual state or a change in appearance of the first indicator while transitioning from the first visual state to the second visual state is detectable by a user while the first gaze input is directed to one of the first affordances in a foveal region of the first user interface.

13. The electronic device of claim 12, wherein a change in the first indicator while transitioning from the first visual state to the second visual state comprises one or more of:
movement of at least a portion of the first indicator in the three-dimensional environment;
a change in an area of at least a portion of the first indicator in the three-dimensional environment;
a change in a size of the first indicator;
a change in a shape of at least a portion of the first indicator;

a change in color of at least a portion of the first indicator; or
a change in brightness of at least a portion of the first indicator.

14. The electronic device of claim 9, wherein the one or more first affordances comprise two first affordances, each of the two first affordances having a circular shape and separated by a factor of three times a diameter of one of the two first affordances.

15. The electronic device of claim 9, wherein an amount of the adjustment corresponding to the first event or a rate of change of the adjustment corresponding to the first event is based on a persistence of the first gaze input at one of the first affordances.

16. The electronic device of claim 9, wherein the one or more criteria include detecting the first gaze input for an amount of time that exceeds a first threshold.

17. A non-transitory computer readable storage medium storing one or more programs, the one or more programs comprising instructions, which when executed by one or more processors of an electronic device in communication with one or more displays and one or more input devices, cause the electronic device to:
present, via the one or more displays, a three-dimensional environment including a first user interface, wherein the first user interface includes a plurality of virtual objects associated with one or more events, the plural-ity of virtual objects including one or more first affor-dances, each first affordance associated with an adjust-ment corresponding to a first event, and a first indicator, the first indicator associated with a state corresponding to the first event and positioned in a perifoveal region of the first user interface relative to the one or more first affordances;
while presenting the three-dimensional environment that includes the first user interface, detect a first gaze input at one of the first affordances of the first user interface; and
in response to detecting the first gaze input,
in accordance with a determination that the first gaze input satisfies one or more criteria, trigger the adjust-ment associated with the first affordance at which the first gaze input was detected and transition, via the one or more displays, from displaying the first indi-cator in a first visual state to displaying the first indicator in a second visual state.

18. The non-transitory computer readable storage medium of claim 17, wherein the one or more first affordances are positioned in a foveal region of the first user interface.

19. The non-transitory computer readable storage medium of claim 17, wherein the first indicator is positioned such that it appears in a perifovea of a user's retina when user gaze is directed to one of the one or more first affordances.

20. The non-transitory computer readable storage medium of claim 17, wherein the perifoveal region of the first user interface is located such that the transition of the first indicator from the first visual state to the second visual state or a change in appearance of the first indicator while transitioning from the first visual state to the second visual state is detectable by a user while the first gaze input is directed to one of the first affordances in a foveal region of the first user interface.

21. The non-transitory computer readable storage medium of claim 20, wherein a change in the first indicator while transitioning from the first visual state to the second visual state comprises one or more of:

movement of at least a portion of the first indicator in the three-dimensional environment;

a change in an area of at least a portion of the first indicator in the three-dimensional environment;

a change in a size of the first indicator;

a change in a shape of at least a portion of the first indicator;

a change in color of at least a portion of the first indicator; or a change in brightness of at least a portion of the first indicator.

22. The non-transitory computer readable storage medium of claim 17, wherein the one or more first affordances comprise two first affordances, each of the two first affordances having a circular shape and separated by a factor of three times a diameter of one of the two first affordances.

23. The non-transitory computer readable storage medium of claim 17, wherein an amount of the adjustment corresponding to the first event or a rate of change of the adjustment corresponding to the first event is based on a persistence of the first gaze input at one of the first affordances.

24. The non-transitory computer readable storage medium of claim 17, wherein the one or more criteria include detecting the first gaze input for an amount of time that exceeds a first threshold.

\* \* \* \* \*